United States Patent
Wang et al.

(10) Patent No.: US 12,181,639 B2
(45) Date of Patent: Dec. 31, 2024

(54) OPTICAL IMAGING LENS ASSEMBLY

(71) Applicant: ZHEJIANG SUNNY OPTICS CO., LTD., Zhejiang (CN)

(72) Inventors: Jian Wang, Zhejiang (CN); Lingbo He, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 549 days.

(21) Appl. No.: 17/521,895

(22) Filed: Nov. 9, 2021

(65) Prior Publication Data
US 2022/0146794 A1 May 12, 2022

(30) Foreign Application Priority Data
Nov. 11, 2020 (CN) .......................... 202011251796.X

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ....... G02B 13/0045; G02B 9/60; G02B 13/18
See application file for complete search history.

(56) References Cited

U.S. PATENT DOCUMENTS 9,964,739 B1 * 5/2018 Shi ..................... G02B 13/0045

* cited by examiner

*Primary Examiner* — Alicia M Harrington
(74) *Attorney, Agent, or Firm* — Samson G. Yu

(57) ABSTRACT

The disclosure provides an optical imaging lens assembly, which sequentially includes, from an object side to an image side along an optical axis: a first lens with a negative refractive power, an object-side surface thereof is a concave surface, an image-side surface thereof is a convex surface; a second lens with a refractive power; a diaphragm; a third lens with a refractive power, an object-side surface thereof is a convex surface, an image-side surface thereof is a convex surface; a fourth lens with a refractive power; and a fifth lens with a refractive power. Semi-FOV is a half of a maximum field of view of the optical imaging lens assembly, and Semi-FOV meets Semi-FOV≥55°.

20 Claims, 15 Drawing Sheets

Longitudinal aberration curve

Astigmatism curve

Distortion curve

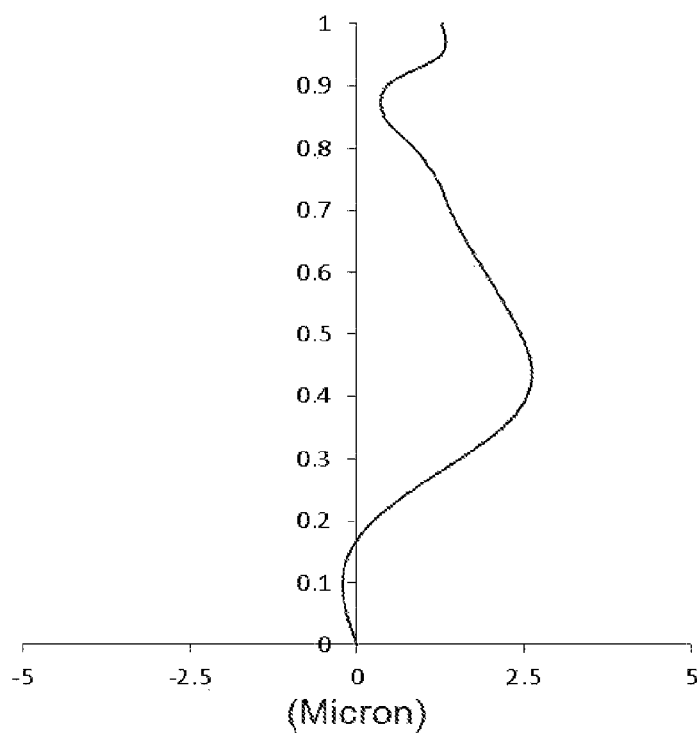
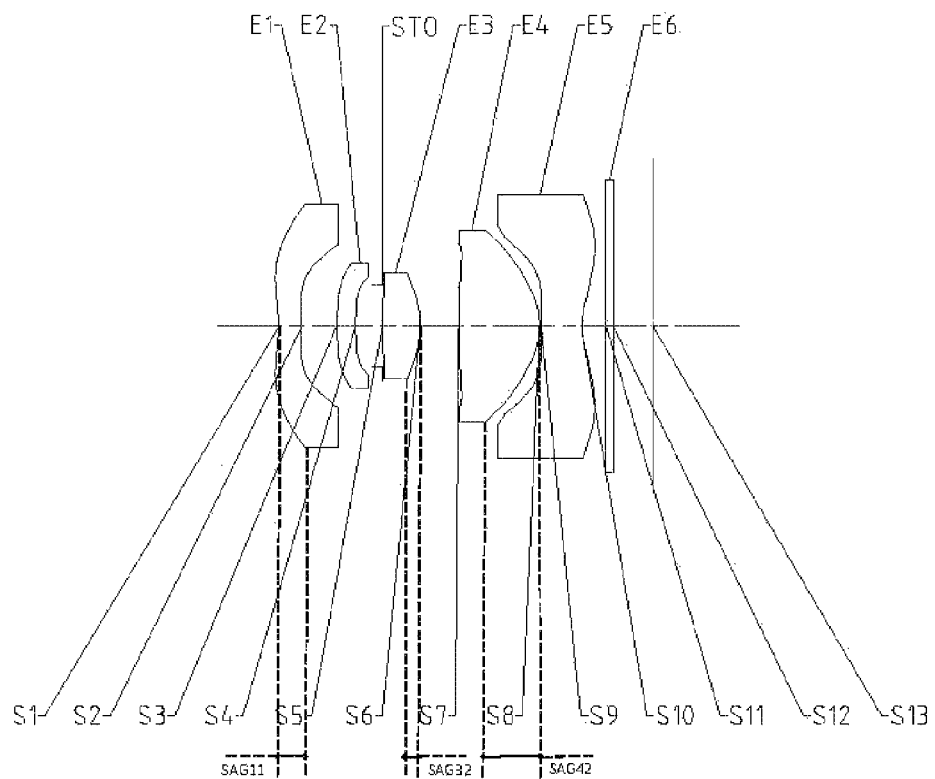

Longitudinal aberration curve

Astigmatism curve

Longitudinal aberration curve

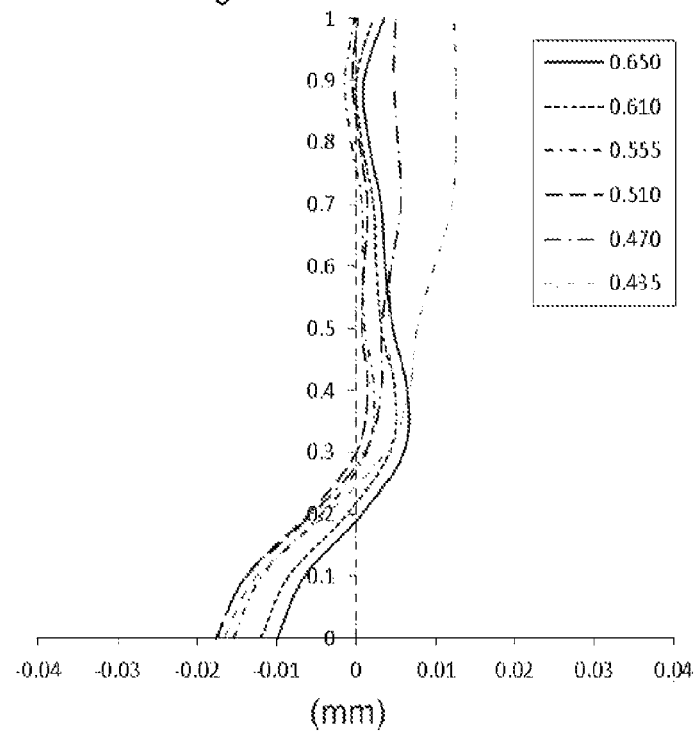
Fig. 8A Longitudinal aberration curve
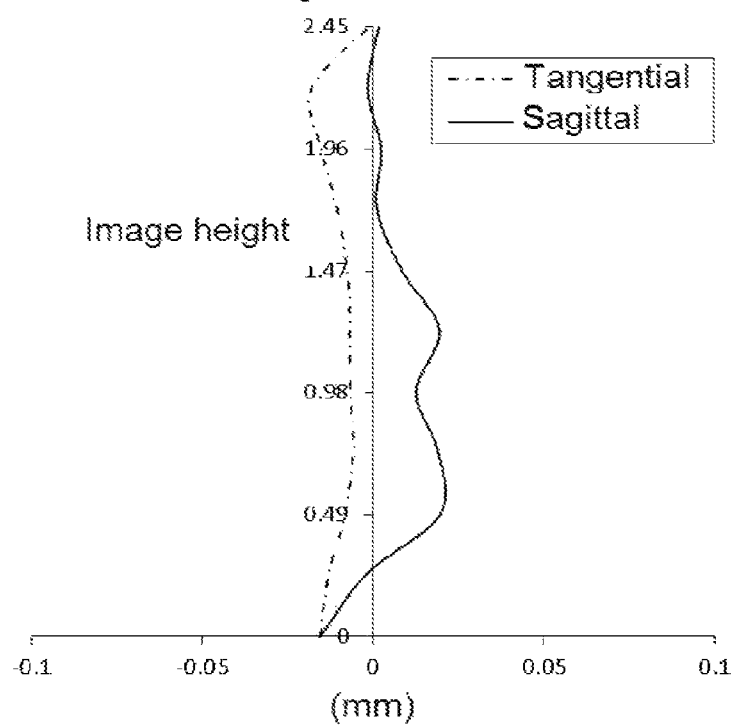
Fig. 8B Astigmatism curve

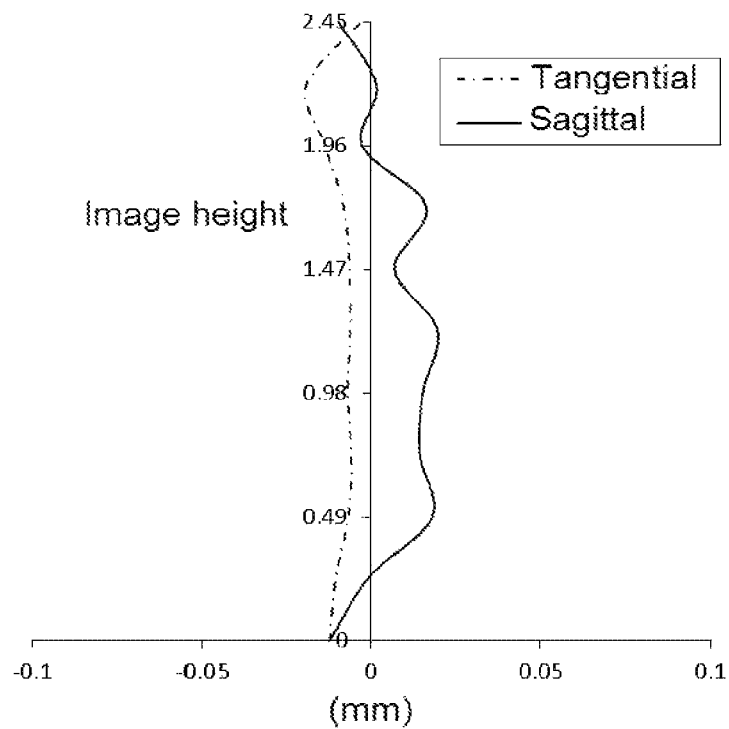
Fig. 10B Astigmatism curve
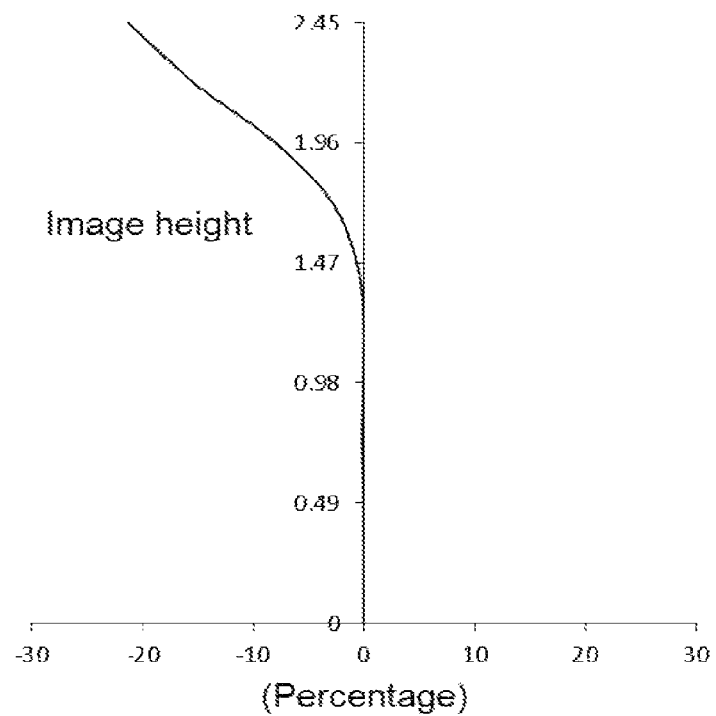
Fig. 10C Distortion curve

Longitudinal aberration curve

Astigmatism curve

Distortion curve

Lateral color curve

OPTICAL IMAGING LENS ASSEMBLY

CROSS-REFERENCE TO RELATED APPLICATIONS

The disclosure claims priority to Chinese Patent Application No. 202011251796.X, filed to the National Intellectual Property Administration, PRC (CNIPA) on Nov. 11, 2020, the disclosure of which is hereby incorporated by reference in its entirety.

TECHNICAL FIELD

The disclosure relates to the field of optical elements, and particularly to an optical imaging lens assembly.

BACKGROUND

With the rapid upgrading of portable electronic products such as smart phones, current smart phones, compared with conventional mobile phones, have become recreational equipment people carry about, in addition to having a call function. Apparently, shooting function of the smart phone has become one of main innovations for the upgrading of smart phones. In addition, requirements of users on pixels, imaging quality, resolutions and the like of imaging lens assemblies of mobile phones have also increased.

In order to photographing requirements of a user on multiple aspects, how to achieve a considerable high-resolution imaging range of an optical imaging lens assembly applied to a smart phone to increase the appeal of a picture based on the characteristics of relatively high imaging quality, wide field of view, great depth of field and the like is one of various problems urgent to be solved by lens designers at present.

SUMMARY

Some embodiments of the disclosure provide an optical imaging lens assembly, which sequentially includes, from an object side to an image side along an optical axis: a first lens with a negative refractive power, an object-side surface thereof is a concave surface, an image-side surface thereof is a convex surface; a second lens with a refractive power; a diaphragm; a third lens with a refractive power, an object-side surface thereof is a convex surface, an image-side surface thereof is a convex surface; a fourth lens with a refractive power; and a fifth lens with a refractive power. Semi-FOV is a half of a maximum field of view of the optical imaging lens assembly, and Semi-FOV may meet Semi-FOV≥55°. SAG11 is a distance from an intersection point of the an object-side surface of the first lens and the optical axis to an effective radius vertex of the object-side surface of the first lens on the optical axis, SAG42 is a distance from an intersection point of an image-side surface of the fourth lens and the optical axis to an effective radius vertex of the image-side surface of the fourth lens on the optical axis, and SAG11 and SAG42 may meet $-2.5<\text{SAG42}/\text{SAG11}<-1.0$.

In an implementation mode, the object-side surface of the first lens to an image-side surface of the fifth lens include at least one aspheric mirror surface.

In an implementation mode, a total effective focal length f of the optical imaging lens assembly and an effective focal length f1 of the first lens may meet $-4.0<f1/f<-2.0$.

In an implementation mode, an effective focal length f3 of the third lens, an effective focal length f4 of the fourth lens and an effective focal length f5 of the fifth lens may meet $-2.5<(f3+f4)/f5<-2.0$.

In an implementation mode, an edge thickness ET1 of the first lens and a center thickness CT1 of the first lens on the optical axis may meet $1.0<\text{ET1}/\text{CT1}<1.5$.

In an implementation mode, an edge thickness ET4 of the fourth lens and a center thickness CT4 of the fourth lens on the optical axis may meet $2.5<\text{CT4}/\text{ET4}<3.5$.

In an implementation mode, SAG32 is a distance from an intersection point of the image-side surface of the third lens and the optical axis to an effective radius vertex of the image-side surface of the third lens on the optical axis, and DT31 is a maximum effective radius of the object-side surface of the third lens, DT31 and SAG32 may meet $-3.5<\text{DT31}/\text{SAG32}<-2.5$.

In an implementation mode, a curvature radius R8 of the image-side surface of the fourth lens and a curvature radius R10 of an image-side surface of the fifth lens may meet $-2.0<\text{R8}/\text{R10}<-0.8$.

In an implementation mode, a curvature radius R5 of the object-side surface of the third lens and a curvature radius R6 of the image-side surface of the third lens may meet $-19.5<\text{R5}/\text{R6}<-4.5$.

In an implementation mode, a center thickness CT2 of the second lens on the optical axis and a center thickness CT3 of the third lens on the optical axis may meet $1.0<\text{CT3}/\text{CT2}<2.5$.

In an implementation mode, a curvature radius R1 of the object-side surface of the first lens and a curvature radius R2 of the image-side surface of the first lens may meet $1.5<\text{R2}/\text{R1}<4.5$.

In an implementation mode, a spacing distance of the third lens and the fourth lens on the optical axis is longer than that of any two adjacent lenses in the first lens to the fifth lens on the optical axis.

In an implementation mode, a spacing distance of the fourth lens and the fifth lens on the optical axis is shorter than that of any two adjacent lenses in the first lens to the fifth lens on the optical axis.

In an implementation mode, ImgH is a half of a diagonal length of an effective pixel region on an imaging surface of the optical imaging lens assembly, and ImgH and a total effective focal length f of the optical imaging lens assembly may meet $1.0<\text{ImgH}/f<1.5$.

In an implementation mode, SL is a distance from the diaphragm to an imaging surface of the optical imaging lens assembly on the optical axis, TTL is a distance from the object-side surface of the first lens to the imaging surface of the optical imaging lens assembly on the optical axis, and SL and TTL may meet $1.0<\text{TTL}/\text{SL}<1.5$.

Another aspect of the disclosure provides an optical imaging lens assembly, which sequentially includes, from an object side to an image side along an optical axis: a first lens with a negative refractive power, an object-side surface thereof is a concave surface, an image-side surface thereof is a convex surface; a second lens with a refractive power; a diaphragm; a third lens with a refractive power, an object-side surface thereof is a convex surface, an image-side surface thereof is a convex surface; a fourth lens with a refractive power; and a fifth lens with a refractive power. Semi-FOV is a half of a maximum field of view of the optical imaging lens assembly, and Semi-FOV may meet Semi-FOV≥55°. An effective focal length f3 of the third lens, an effective focal length f4 of the fourth lens and an effective focal length f5 of the fifth lens may meet $-2.5<(f3+f4)/f5<-2.0$.

In an implementation mode, a total effective focal length f of the optical imaging lens assembly and an effective focal length f1 of the first lens may meet $-4.0<f1/f<-2.0$.

In an implementation mode, an edge thickness ET1 of the first lens and a center thickness CT1 of the first lens on the optical axis may meet $1.0<ET1/CT1<1.5$.

In an implementation mode, an edge thickness ET4 of the fourth lens and a center thickness CT4 of the fourth lens on the optical axis may meet $2.5<CT4/ET4<3.5$.

In an implementation mode, SAG32 is a distance from an intersection point of the image-side surface of the third lens and the optical axis to an effective radius vertex of the image-side surface of the third lens on the optical axis, and DT31 is a maximum effective radius of an object-side surface of the third lens, DT31 and SAG32 may meet $-3.5<DT31/SAG32<-2.5$.

In an implementation mode, a curvature radius R8 of an image-side surface of the fourth lens and a curvature radius R10 of an image-side surface of the fifth lens may meet $-2.0<R8/R10<-0.8$.

In an implementation mode, a curvature radius R5 of the object-side surface of the third lens and a curvature radius R6 of the image-side surface of the third lens may meet $-19.5<R5/R6<-4.5$.

In an implementation mode, a center thickness CT2 of the second lens on the optical axis and a center thickness CT3 of the third lens on the optical axis may meet $1.0<CT3/CT2<2.5$.

In an implementation mode, a curvature radius R1 of the object-side surface of the first lens and a curvature radius R2 of the image-side surface of the first lens may meet $1.5<R2/R1<4.5$.

In an implementation mode, SAG11 is a distance from an intersection point of the object-side surface of the first lens and the optical axis to an effective radius vertex of the object-side surface of the first lens on the optical axis, SAG42 is a distance from an intersection point of an image-side surface of the fourth lens and the optical axis to an effective radius vertex of the image-side surface of the fourth lens on the optical axis, and SAG11 and SAG42 may meet $-2.5<SAG42/SAG11<-1.0$.

In an implementation mode, a spacing distance of the third lens and the fourth lens on the optical axis is longer than that of any two adjacent lenses in the first lens to the fifth lens on the optical axis.

In an implementation mode, a spacing distance of the fourth lens and the fifth lens on the optical axis is shorter than that of any two adjacent lenses in the first lens to the fifth lens on the optical axis.

In an implementation mode, ImgH is a half of a diagonal length of an effective pixel region on an imaging surface of the optical imaging lens, ImgH and the total effective focal length f of the optical imaging lens may meet $1.0<ImgH/f<1.5$.

In an implementation mode, SL is a distance from the diaphragm to an imaging surface of the optical imaging lens assembly on the optical axis, TTL is a distance from the object-side surface of the first lens to the imaging surface of the optical imaging lens assembly on the optical axis, and SL and TTL may meet $1.0<TTL/SL<1.5$.

According to the disclosure, multiple (for example, five) lenses are adopted, and the refractive power and surface types of each lens, the center thickness of each lens, on-axis distances between the lenses and the like are reasonably configured to achieve at least one beneficial effect of wide angle, great focal length, large image surface, high imaging quality and the like of the optical imaging lens assembly.

BRIEF DESCRIPTION OF THE DRAWINGS

Detailed descriptions made to unrestrictive implementation modes with reference to the following drawings are read to make the other characteristics, purposes and advantages of the disclosure more apparent.

FIGS. 2A to 2D show a longitudinal aberration curve, an astigmatism curve, a distortion curve, and a lateral color curve of an optical imaging lens assembly according to embodiment 1 respectively;

FIG. 3 shows a structure diagram of an optical imaging lens assembly according to embodiment 2 of the disclosure;

FIGS. 8A to 8D show a longitudinal aberration curve, an astigmatism curve, a distortion curve, and a lateral color curve of an optical imaging lens assembly according to embodiment 4 respectively;

FIGS. 10A to 10D show a longitudinal aberration curve, an astigmatism curve, a distortion curve, and a lateral color curve of an optical imaging lens assembly according to embodiment 5 respectively;

DETAILED DESCRIPTION OF THE EMBODIMENTS

Figure 1:
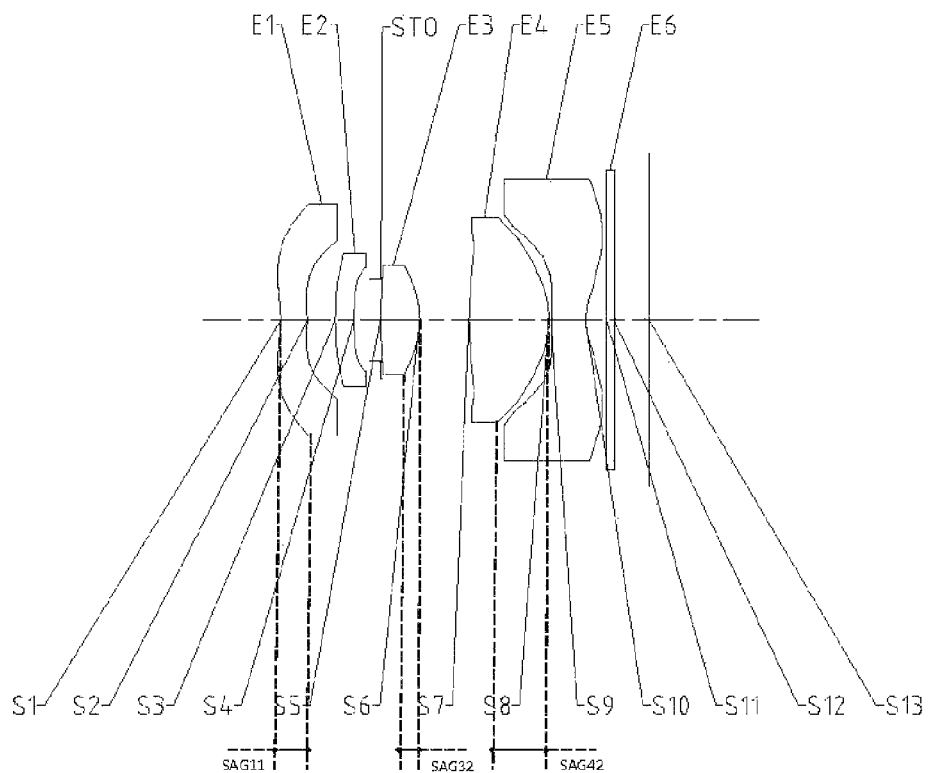
FIG. 1 shows a structure diagram of an optical imaging lens assembly according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include five lenses with refractive power respectively, i.e., a first lens, a second lens, a third lens, a fourth lens and a fifth lens. The five lenses are sequentially arranged from an object side to an image side along an optical axis. There may be a spacing distance between any two adjacent lenses in the first lens to the fifth lens.

In an exemplary implementation mode, the first lens may have a negative refractive power, an object-side surface thereof may be a concave surface, while an image-side surface may be a convex surface. The second lens may have a positive refractive power or a negative refractive power. The third lens may have a positive refractive power or a negative refractive power, an object-side surface thereof may be a convex surface, while an image-side surface may be a convex surface. The fourth lens may have a positive refractive power or a negative refractive power. The fifth lens may have a positive refractive power or a negative refractive power.

In the exemplary implementation mode, the refractive power and surface type feature of the first lens are set reasonably to help to reduce an inclination angle of incident light to endow the optical imaging lens assembly with the characteristics of wide field of view and the like. The surface types of the third lens are set reasonably, so that the tolerance sensitivity of the optical imaging lens assembly may be reduced effectively.

In an exemplary implementation mode, the optical imaging lens assembly according to the disclosure may meet Semi-FOV≥55°, wherein Semi-FOV is a half of a maximum field of view of the optical imaging lens assembly. Semi-FOV≥55° is met, so that an object information collection capability of the optical imaging lens assembly may be improved.

In an exemplary implementation mode, the optical imaging lens assembly according to the disclosure may meet $-4.0<f1/f<-2.0$, wherein f is a total effective focal length of the optical imaging lens assembly, and f1 is an effective focal length of the first lens. More specifically, f1 and f may further meet $-4.0<f1/f<-2.3$. $-4.0<f1/f<-2.0$ is met, so that a light deflection angle may be reduced, and the imaging quality of the optical imaging lens assembly may be improved.

In an exemplary implementation mode, the optical imaging lens assembly according to the disclosure may meet $-2.5<(f3+f4)/f5<-2.0$, wherein f3 is an effective focal length of the third lens, f4 is an effective focal length of the fourth lens, and f5 is an effective focal length of the fifth lens. Meeting $-2.5<(f3+f4)/f5<-2.0$ is favorable for balancing an off-axis aberration of the optical imaging lens assembly.

In an exemplary implementation mode, the optical imaging lens assembly according to the disclosure may meet $1.0<ET1/CT1<1.5$, wherein ET1 is an edge thickness of the first lens, and CT1 is a center thickness of the first lens on the optical axis. $1.0<ET1/CT1<1.5$ is met, so that the first lens is high in machinability, and in addition, the distortion influence of the optical imaging lens assembly may be balanced to facilitate the achievement of a better imaging effect.

In an exemplary implementation mode, the optical imaging lens assembly according to the disclosure may meet $2.5<CT4/ET4<3.5$, wherein ET4 is an edge thickness of the fourth lens, and CT4 is a center thickness of the fourth lens on the optical axis. More specifically, CT4 and ET4 may further meet $2.8<CT4/ET4<3.1$. Meeting $2.5<CT4/ET4<3.5$ may achieve high machinability of the fourth lens, and meanwhile, is favorable for ensuring relatively high imaging quality.

In an exemplary implementation mode, the optical imaging lens assembly according to the disclosure may meet $-3.5<DT31/SAG32<-2.5$, wherein DT31 is a maximum effective radius of the object-side surface of the third lens, and SAG32 is a distance from an intersection point of the image-side surface of the third lens and the optical axis to an effective radius vertex of the image-side surface of the third lens on the optical axis. More specifically, DT31 and SAG32 may further meet $-3.4<DT31/SAG32<-2.5$. Meeting $-3.5<DT31/SAG32<-2.5$ is favorable for achieving higher assembling stability of the optical imaging lens assembly.

In an exemplary implementation mode, the optical imaging lens assembly according to the disclosure may meet $-2.5<SAG42/SAG11<-1.0$, wherein SAG11 is a distance from an intersection point of the object-side surface of the first lens and the optical axis to an effective radius vertex of the object-side surface of the first lens on the optical axis, and SAG42 is a distance from an intersection point of an image-side surface of the fourth lens and the optical axis to an effective radius vertex of the image-side surface of the fourth lens on the optical axis. More specifically, SAG42 and SAG11 may further meet −2.2<SAG42/SAG11<−1.3. Meeting −2.5<SAG42/SAG11<−1.0 is favorable for improving relative illuminance in an off-axis field of view.

In an exemplary implementation mode, the optical imaging lens assembly according to the disclosure may meet −2.0<R8/R10<−0.8, wherein R8 is a curvature radius of an image-side surface of the fourth lens, and R10 is a curvature radius of an image-side surface of the fifth lens. More specifically, R8 and R10 may further meet −1.7<R8/R10<−0.8. Meeting −2.0<R8/R10<−0.8 is favorable for reasonably controlling a total deflection angle on the image-side surface of the fourth lens and the image-side surface of the fifth lens in a marginal field of view in a reasonable range and may effectively reduce the sensitivity of the lens assembly.

In an exemplary implementation mode, the optical imaging lens assembly according to the disclosure may meet −19.5<R5/R6<−4.5, wherein R5 is a curvature radius of the object-side surface of the third lens, and R6 is a curvature radius of the image-side surface of the third lens. More specifically, R5 and R6 may further meet −19.5<R5/R6<−4.8. −19.5<R5/R6<−4.5 is met, so that the contribution of the third lens to the astigmatism of the optical imaging lens assembly may be controlled reasonably.

In an exemplary implementation mode, the optical imaging lens assembly according to the disclosure may meet 1.0<CT3/CT2<2.5, wherein CT2 is a center thickness of the second lens on the optical axis, and CT3 is a center thickness of the third lens on the optical axis. More specifically, CT3 and CT2 may further meet 1.2<CT3/CT2<2.2. 1.0<CT3/CT2<2.5 is met, so that the lens is easy to form by injection molding, and the machinability of the optical imaging lens assembly may be improved.

In an exemplary implementation mode, the optical imaging lens assembly according to the disclosure may meet 1.5<R2/R1<4.5, wherein R1 is a curvature radius of the object-side surface of the first lens, and R2 is a curvature radius of the image-side surface of the first lens. More specifically, R2 and R1 may further meet 1.7<R2/R1<4.2. 1.5<R2/R1<4.5 is met, so that the contribution of the first lens to the astigmatism of the optical imaging lens assembly may be controlled.

In an exemplary implementation mode, a spacing distance of the third lens and the fourth lens on the optical axis may be longer than that of any two adjacent lenses in the first lens to the fifth lens on the optical axis. More specifically, the spacing distance T34 of the third lens and the fourth lens on the optical axis may be longer than a spacing distance T12 of the first lens and the second lens on the optical axis. The spacing distance T34 of the third lens and the fourth lens on the optical axis may be longer than a spacing distance T23 of the second lens and the third lens on the optical axis. The spacing distance T34 of the third lens and the fourth lens on the optical axis may be longer than a spacing distance T45 of the fourth lens and the fifth lens on the optical axis. Furthermore, T34 may meet 0.55 mm<T34<0.75 mm. T12 may meet 0.41 mm<T12<0.67 mm. T23 may meet 0.34 mm<T23<0.41 mm. T45 may meet 0.02 mm<T45<0.07 mm. The spacing distance of the third lens and the fourth lens on the optical axis is longer than that of any two adjacent lenses in the first lens to the fifth lens on the optical axis, so that correction of a spherical aberration of the optical imaging lens assembly is facilitated.

In an exemplary implementation mode, a spacing distance of the fourth lens and the fifth lens on the optical axis may be shorter than that of any two adjacent lenses in the first lens to the fifth lens on the optical axis. More specifically, the spacing distance T45 of the fourth lens and the fifth lens on the optical axis may be shorter than a spacing distance T12 of the first lens and the second lens on the optical axis. The spacing distance T45 of the fourth lens and the fifth lens on the optical axis may be shorter than a spacing distance T23 of the second lens and the third lens on the optical axis. The spacing distance T45 of the fourth lens and the fifth lens on the optical axis may be shorter than a spacing distance T34 of the third lens and the fourth lens on the optical axis. Furthermore, T45 may meet 0.02 mm<T45<0.07 mm. T12 may meet 0.41 mm<T12<0.67 mm. T23 may meet 0.34 mm<T23<0.41 mm. T34 may meet 0.55 mm<T34<0.75 mm. The spacing distance of the fourth lens and the fifth lens on the optical axis is longer than that of any two adjacent lenses in the first lens to the fifth lens on the optical axis, so that balancing of the astigmatism of the optical imaging lens assembly is facilitated.

In an exemplary implementation mode, the optical imaging lens assembly according to the disclosure may meet 1.0<ImgH/f<1.5, wherein ImgH is a half of a diagonal length of an effective pixel region on an imaging surface of the optical imaging lens assembly, and f is a total effective focal length of the optical imaging lens assembly. More specifically, ImgH and f may further meet 1.1<ImgH/f<1.4. 1.0<ImgH/f<1.5 is met, so that the field of view of the optical imaging lens assembly may be controlled effectively.

In an exemplary implementation mode, the optical imaging lens assembly according to the disclosure further includes a diaphragm arranged between the second lens and the third lens. Optionally, the optical imaging lens assembly may further include an optical filter configured to correct the chromatic aberration and/or protective glass configured to protect a photosensitive element on the imaging surface.

In an exemplary implementation mode, the optical imaging lens assembly according to the disclosure may meet 1.0<TTL/SL<1.5, wherein SL is a distance from the diaphragm to an imaging surface of the optical imaging lens assembly on the optical axis, and TTL is a distance from the object-side surface of the first lens to the imaging surface of the optical imaging lens assembly on the optical axis. More specifically, TTL and SL may further meet 1.3<TTL/SL<1.5. 1.0<TTL/SL<1.5 is met, so that a coma, astigmatism, distortion, longitudinal aberration and the like related to the diaphragm may be corrected effectively.

The optical imaging lens assembly according to the implementation mode of the disclosure may adopt multiple lenses, for example, the above-mentioned five. The refractive power and surface types of each lens, the center thickness of each lens, on-axis distances between the lenses and the like are reasonably configured to effectively reduce the size of the optical imaging lens assembly, improve the machinability of the optical imaging lens assembly and ensure that the optical imaging lens assembly is more favorable for production and machining and applicable to a portable electronic product. The optical imaging lens assembly as configured above has the characteristics of wide angle, great focal length, large image surface, high resolution, high imaging quality and the like, and may meet using requirements of various portable electronic products in a shooting scenario.

In the implementation mode of the disclosure, at least one of mirror surfaces of each lens is an aspheric mirror surface, namely at least one mirror surface in the object-side surface of the first lens to the image-side surface of the fifth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible to further improve the imaging quality. Optionally, at least one of the object-side surface and image-side surface of each lens in the first lens, the second lens, the third lens, the fourth lens and the fifth lens is an aspheric mirror surface. Optionally, both the object-side surface and image-side surface of each lens in the first lens, the second lens, the third lens, the fourth lens and the fifth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with five lenses as an example, the optical imaging lens assembly is not limited to five lenses. If necessary, the optical imaging lens assembly may further include another number of lenses.

Specific embodiments applied to the optical imaging lens assembly of the above-mentioned implementation mode will further be described below with reference to the drawings.

Embodiment 1

An optical imaging lens assembly according to embodiment 1 of the disclosure will be described below with reference to FIGS. 1 to 2D. FIG. 1 is a structure diagram of an optical imaging lens assembly according to embodiment 1 of the disclosure.

As shown in FIG. 1, the optical imaging lens assembly sequentially includes, from an object side to an image side, a first lens E1, a second lens E2, a diaphragm STO, a third lens E3, a fourth lens E4, a fifth lens E5, an optical filter E6, and an imaging surface S13.

The first lens E1 has a negative refractive power, an object-side surface S1 thereof is a concave surface, while an image-side surface S2 is a convex surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The optical filter E6 has an object-side surface S11 and an image-side surface S12. Light from an object sequentially penetrates through each of the surfaces S1 to S12 and is finally imaged on the imaging surface S13.

Table 1 shows a basic parameter table of the optical imaging lens assembly of embodiment 1, and units of the curvature radius, the thickness/distance and the focal length are all millimeter (mm).

TABLE 1

| Surface number | Surface type | Curvature radius | Thickness/ distance | Refractive index | Abbe number | Focal length | Conic coefficient |
| --- | --- | --- | --- | --- | --- | --- | --- |
| OBJ | Spherical | Infinite | Infinite | | | | |
| S1 | Aspheric | −1.8580 | 0.3961 | 1.54 | 55.8 | −7.39 | −0.2384 |
| S2 | Aspheric | −3.7562 | 0.4157 | | | | −84.1805 |
| S3 | Aspheric | 8.3759 | 0.2800 | 1.67 | 20.4 | −21.61 | 66.4759 |
| S4 | Aspheric | 5.2272 | 0.4025 | | | | 39.5020 |
| STO | Spherical | Infinite | −0.0100 | | | | |
| S5 | Aspheric | 7.8610 | 0.5850 | 1.55 | 56.1 | 2.49 | 90.0000 |
| S6 | Aspheric | −1.6017 | 0.7368 | | | | −7.7832 |
| S7 | Aspheric | 6.9997 | 1.1995 | 1.55 | 56.1 | 2.28 | −46.6400 |
| S8 | Aspheric | −1.4253 | 0.0250 | | | | −1.0000 |
| S9 | Aspheric | 3.3270 | 0.5196 | 1.67 | 20.4 | −2.02 | 0.4914 |
| S10 | Aspheric | 0.8997 | 0.3126 | | | | −1.1960 |
| S11 | Spherical | Infinite | 0.1100 | 1.52 | 64.2 | | |
| S12 | Spherical | Infinite | 0.5274 | | | | |
| S13 | Spherical | Infinite | | | | | |

In the example, a total effective focal length f of the optical imaging lens assembly is 2.06 mm. TTL is a total length of the optical imaging lens assembly (i.e., a distance from the object-side surface S1 of the first lens E1 to the imaging surface S13 of the optical imaging lens assembly on an optical axis), and TTL is 5.50 mm. ImgH is a half of a diagonal length of an effective pixel region on the imaging surface S13 of the optical imaging lens assembly, and ImgH is 2.45 mm. Semi-FOV is a half of a maximum field of view of the optical imaging lens assembly, and Semi-FOV is 56.6°. Fno is an F-number of the optical imaging lens assembly, and Fno is 2.28. SAG11 is a distance from an intersection point of the object-side surface of the first lens and the optical axis to an effective radius vertex of the object-side surface of the first lens on the optical axis, and SAG11 is 0.39 mm. SAG32 is a distance from an intersection point of the image-side surface of the third lens and the optical axis to an effective radius vertex of the image-side surface of the third lens on the optical axis, and SAG32 is −0.21 mm. SAG42 is a distance from an intersection point of the image-side surface of the fourth lens and the optical axis to an effective radius vertex of the image-side surface of the fourth lens on the optical axis, and SAG42 is −0.75 mm.

In embodiment 1, both the object-side surface and image-side surface of any lens in the first lens E1 to the fifth lens E5 are aspheric surfaces, and a surface type x of each aspheric lens may be defined through, but not limited to, the following aspheric surface formula:

$$x = \frac{ch^2}{1 + \sqrt{1-(k+1)c^2h^2}} + \sum A_i h^i, \quad (1)$$

wherein x is a distance vector height of a distance between the aspheric surface and a vertex of the aspheric surface when the aspheric surface is located at a position with the height h along the optical axis direction, c=1/R (namely, the paraxial curvature c is a reciprocal of the curvature radius R in Table 1 above); k is a conic coefficient; and Ai is a correction coefficient of the i-th order of the aspheric surface. Table 2 shows high-order coefficients A4, A6, A8, A10, A12, A14, A16, A18 and A20 that can be used for each of aspheric mirror surfaces S1-S10 in embodiment 1.

As shown in FIG. 3, the optical imaging lens assembly sequentially includes, from an object side to an image side, a first lens E1, a second lens E2, a diaphragm STO, a third lens E3, a fourth lens E4, a fifth lens E5, an optical filter E6, and an imaging surface S13.

The first lens E1 has a negative refractive power, an object-side surface S1 thereof is a concave surface, while an image-side surface S2 is a convex surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The optical filter E6 has an object-side surface S11 and an image-side surface S12. Light from an object sequentially penetrates through each of the surfaces S1 to S12 and is finally imaged on the imaging surface S13.

In the example, a total effective focal length f of the optical imaging lens assembly is 1.90 mm. TTL is a total

TABLE 2

| Surface number | A4 | A6 | A8 | A10 | A12 | A14 | A16 | A18 | A20 |
|---|---|---|---|---|---|---|---|---|---|
| S1 | 1.1477E+00 | −1.3700E−01 | 3.3499E−02 | −9.5966E−03 | 3.0861E−03 | −9.3356E−04 | 3.0556E−04 | −9.4339E−05 | 1.5806E−05 |
| S2 | 4.4230E−01 | −2.7816E−02 | 2.7434E−04 | −1.9627E−03 | −2.5310E−05 | 1.0513E−04 | 9.3866E−06 | 1.4702E−05 | −7.5805E−06 |
| S3 | 4.3971E−02 | −8.6282E−03 | 7.9162E−04 | −6.7730E−04 | 1.5007E−04 | −7.5404E−05 | 1.3582E−05 | −8.5802E−06 | −1.0994E−06 |
| S4 | 4.4095E−02 | 5.1604E−03 | 1.7711E−03 | 3.0517E−04 | 1.8812E−04 | 2.4532E−05 | 2.0336E−05 | −3.2520E−06 | −2.8880E−06 |
| S5 | 1.3878E−03 | 6.9052E−04 | 8.3360E−05 | −2.9940E−09 | −9.1729E−06 | −3.9561E−06 | 0.0000E+00 | 0.0000E+00 | 0.0000E+00 |
| S6 | −1.1656E−01 | 2.0122E−02 | −7.6763E−03 | −6.6863E−03 | −1.5523E−03 | 1.6686E−03 | 1.8203E−03 | 8.4637E−04 | 1.8453E−04 |
| S7 | −3.5872E−02 | −3.9591E−02 | 1.9851E−03 | 4.4433E−03 | 3.5418E−03 | 8.0369E−04 | −1.5877E−05 | −2.3317E−04 | −1.0936E−04 |
| S8 | 4.6679E−02 | −4.0859E−02 | −2.6291E−03 | 1.0025E−02 | 7.4730E−03 | 1.0396E−03 | 7.4805E−04 | −2.5558E−04 | 7.5285E−06 |
| S9 | −1.1622E+00 | 1.5976E−01 | −8.8260E−03 | 9.8151E−03 | 2.9942E−03 | −1.8951E−03 | 8.8456E−05 | −3.9127E−04 | 1.3632E−04 |
| S10 | −2.2786E+00 | 4.8217E−01 | −1.3627E−01 | 5.4234E−02 | −1.9334E−02 | 5.5383E−03 | −2.7466E−03 | 6.5674E−04 | −2.6247E−04 |

Figure 2A:
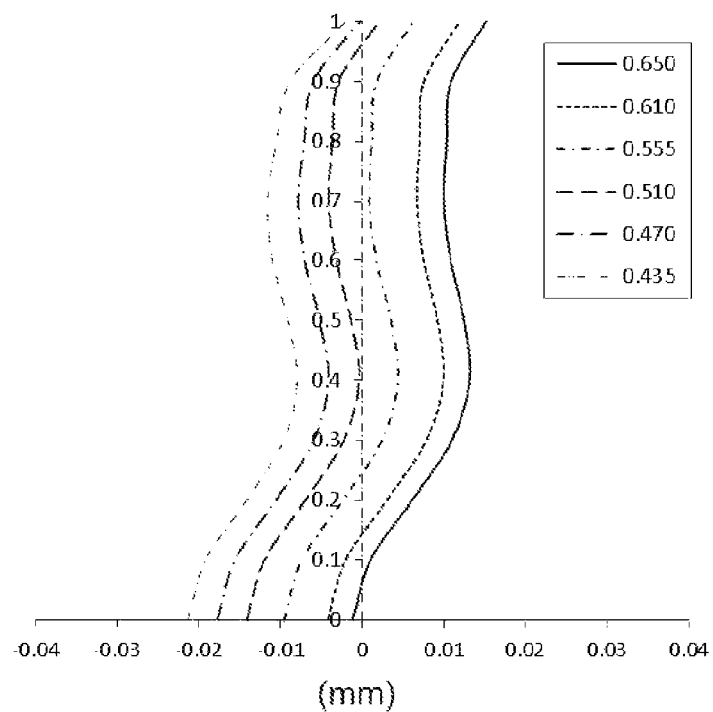
Figure 2B:
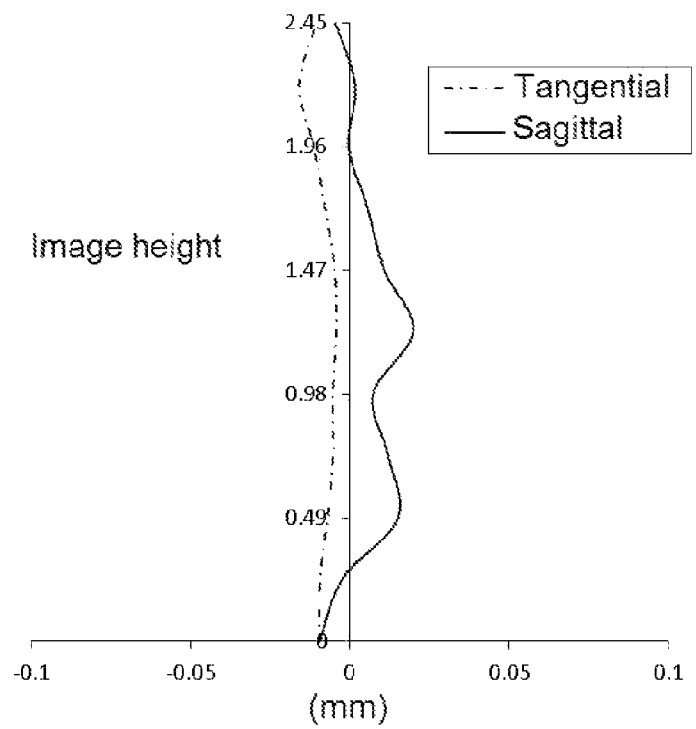
Figure 2C:
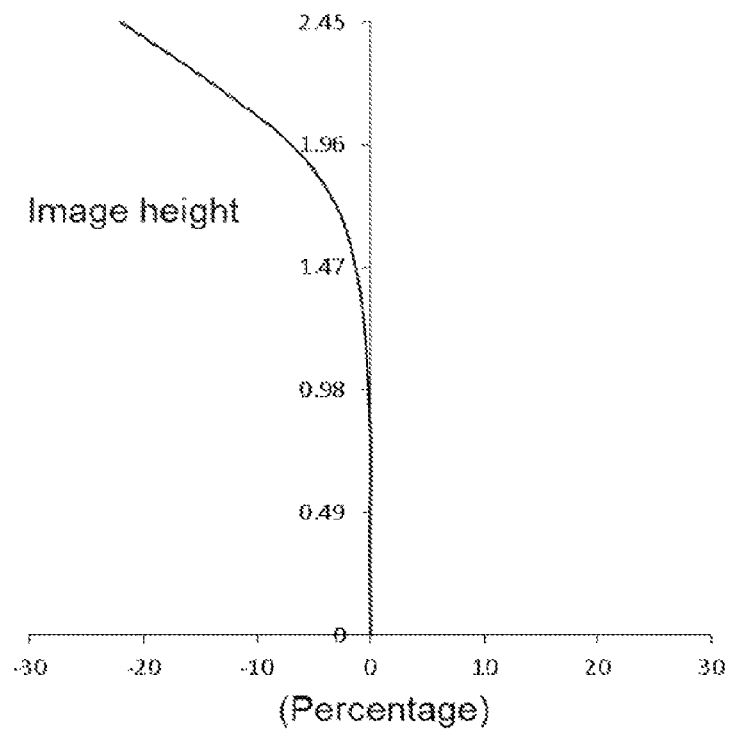

FIG. 2A shows a longitudinal aberration curve of the optical imaging lens assembly according to embodiment 1 to represent deviation of a convergence focal point after light with different wavelengths passes through the lens assembly. FIG. 2B shows an astigmatism curve of the optical imaging lens assembly according to embodiment 1 to represent a tangential image surface curvature and a sagittal image surface curvature. FIG. 2C shows a distortion curve of the optical imaging lens assembly according to embodiment 1 to represent distortion values corresponding to different image heights. FIG. 2D shows a lateral color curve of the optical imaging lens assembly according to embodiment 1 to represent deviation of different image heights on the imaging surface after the light passes through the lens assembly. According to FIGS. 2A to 2D, it can be seen that the optical imaging lens assembly provided in embodiment 1 may achieve high imaging quality.

Embodiment 2

An optical imaging lens assembly according to embodiment 2 of the disclosure will be described below with reference to FIGS. 3 to 4D. In the embodiment and the following embodiments, part of descriptions similar to those about embodiment 1 are omitted for simplicity. FIG. 3 is a structure diagram of an optical imaging lens assembly according to embodiment 2 of the disclosure.

length of the optical imaging lens assembly, and TTL is 5.54 mm. ImgH is a half of a diagonal length of an effective pixel region on the imaging surface S13 of the optical imaging lens assembly, and ImgH is 2.45 mm. Semi-FOV is a half of a maximum field of view of the optical imaging lens assembly, and Semi-FOV is 58.7°. Fno is an F-number of the optical imaging lens assembly, and Fno is 2.19. SAG11 is a distance from an intersection point of the object-side surface of the first lens and the optical axis to an effective radius vertex of the object-side surface of the first lens on the optical axis, and SAG11 is 0.36 mm. SAG32 is a distance from an intersection point of the image-side surface of the third lens and the optical axis to an effective radius vertex of the image-side surface of the third lens on the optical axis, and SAG32 is −0.19 mm. SAG42 is a distance from an intersection point of the image-side surface of the fourth lens and the optical axis to an effective radius vertex of the image-side surface of the fourth lens on the optical axis, and SAG42 is −0.79 mm.

Table 3 shows a basic parameter table of the optical imaging lens assembly of embodiment 2, and units of the curvature radius, the thickness/distance and the focal length are all millimeter (mm). Table 4 shows high-order coefficients that can be used for each aspheric mirror surface in embodiment 2. A surface type of each aspheric surface may be defined by the formula (1) given in embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −1.5774 | 0.3311 | 1.54 | 55.8 | −5.34 | −0.2903 |
| S2 | Aspheric | −3.7649 | 0.5183 | | | | −90.0000 |
| S3 | Aspheric | 6.6000 | 0.2800 | 1.67 | 20.4 | 135.23 | 43.5985 |
| S4 | Aspheric | 7.0000 | 0.4025 | | | | 88.7066 |
| STO | Spherical | Infinite | −0.0019 | | | | |
| S5 | Aspheric | 29.0784 | 0.5633 | 1.55 | 56.1 | 2.62 | 7.5973 |
| S6 | Aspheric | −1.4961 | 0.5704 | | | | −8.8996 |
| S7 | Aspheric | 35.4793 | 1.2000 | 1.55 | 56.1 | 1.96 | −44.7748 |
| S8 | Aspheric | −1.0885 | 0.0250 | | | | −0.9696 |
| S9 | Aspheric | 4.9699 | 0.5948 | 1.67 | 20.4 | −1.94 | 5.5999 |
| S10 | Aspheric | 0.9796 | 0.3679 | | | | −1.1330 |
| S11 | Spherical | Infinite | 0.1100 | 1.52 | 64.2 | | |
| S12 | Spherical | Infinite | 0.5827 | | | | |
| S13 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 1.9423E+00 | −2.2051E−01 | 8.6053E−02 | −1.1588E−02 | 1.0673E−02 | −2.5119E−03 | 1.2451E−03 | −2.1093E−04 | 2.0959E−04 |
| S2 | 6.5603E−01 | −5.2474E−02 | −7.4400E−03 | −3.3172E−03 | 2.2893E−03 | 1.1094E−03 | −2.2568E−04 | −2.3982E−04 | −1.6326E−04 |
| S3 | 1.3448E−01 | −5.5902E−03 | −6.1471E−03 | −2.4615E−03 | −3.7992E−04 | −1.4502E−05 | 5.7307E−05 | 1.0311E−05 | −5.1447E−06 |
| S4 | 1.0650E−01 | 1.0216E−02 | 5.5747E−04 | −5.8016E−04 | −2.9296E−04 | −1.4257E−04 | −2.4042E−05 | −1.4619E−05 | −2.5761E−06 |
| S5 | 1.3772E−02 | 1.2318E−03 | 1.0111E−04 | 9.6382E−06 | −3.0600E−06 | 1.0873E−06 | 0.0000E+00 | 0.0000E+00 | 0.0000E+00 |
| S6 | −5.7144E−02 | 7.2752E−03 | 6.4074E−04 | 3.5962E−04 | 6.5525E−05 | 3.9703E−06 | 8.8369E−06 | −2.7899E−06 | 4.4384E−06 |
| S7 | 2.6731E−02 | −3.0841E−02 | −2.8684E−03 | −5.0974E−04 | 8.6969E−04 | 3.7178E−04 | 2.0723E−04 | 3.9452E−05 | 3.0984E−06 |
| S8 | 1.2917E−01 | −3.1665E−02 | −6.3935E−03 | 6.3979E−03 | 2.1524E−03 | 1.8130E−03 | 2.7409E−04 | 1.0132E−05 | −7.5577E−06 |
| S9 | −1.1649E+00 | 2.1187E−01 | 2.0056E−02 | 8.3055E−03 | −9.5217E−03 | −1.5837E−03 | 4.2479E−04 | 5.3893E−04 | 4.5649E−04 |
| S10 | −2.0577E+00 | 4.0667E−01 | −9.7901E−02 | 4.6773E−02 | −1.5576E−02 | 5.2595E−03 | −2.9274E−03 | 5.7840E−04 | −4.1488E−04 |

Figure 4A:
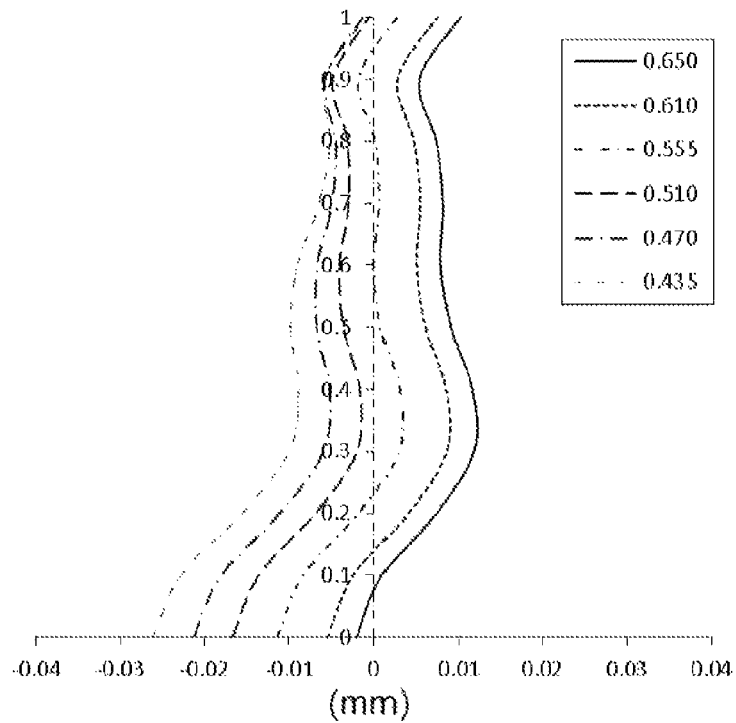
FIGS. 4A to 4D show a longitudinal aberration curve, an astigmatism curve, a distortion curve, and a lateral color curve of an optical imaging lens assembly according to embodiment 2 respectively.
Figure 4B:
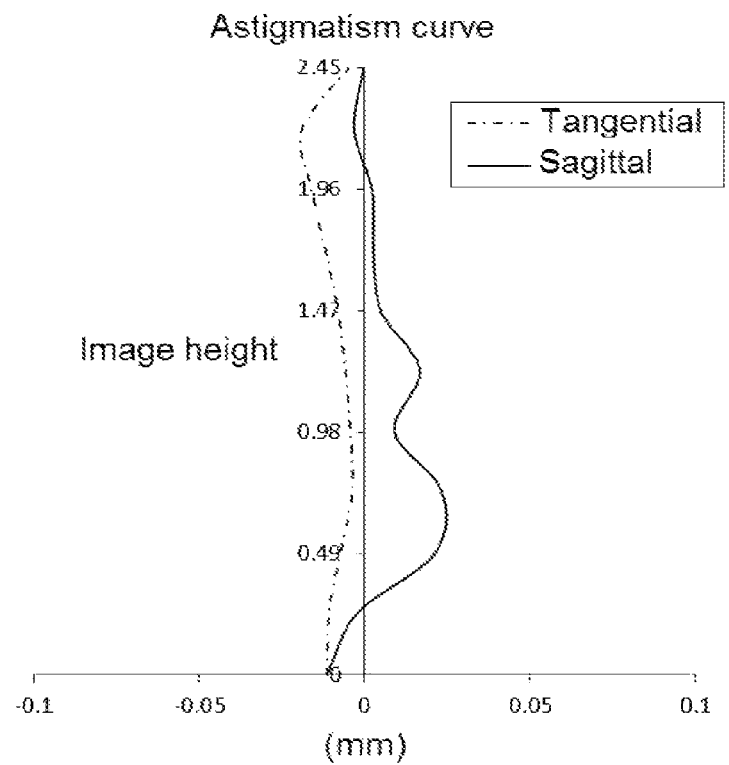
Figure 4C:
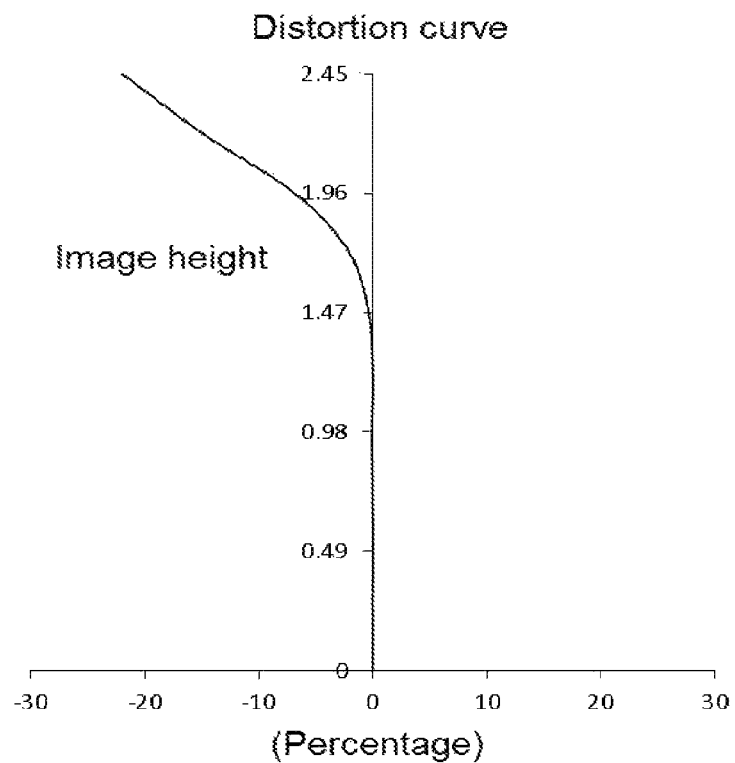
Figure 4D:
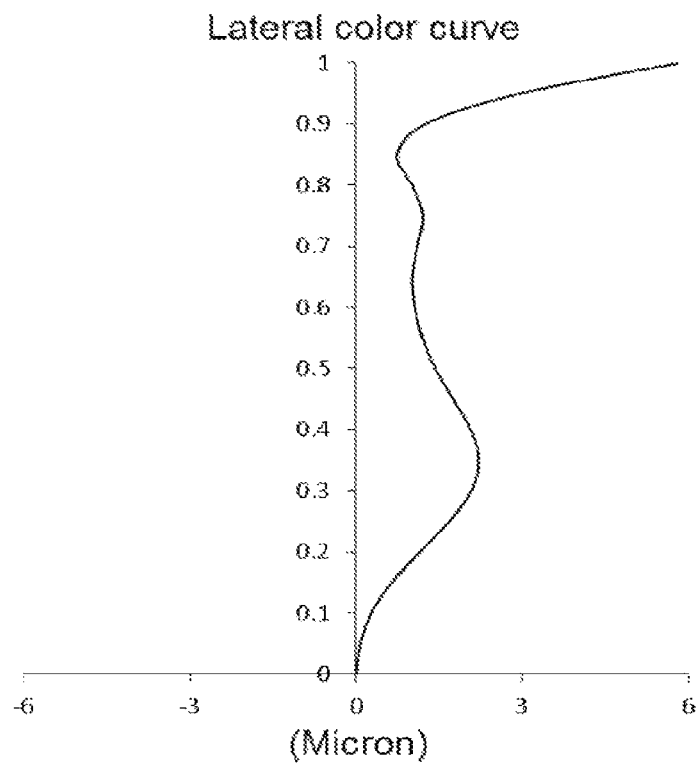

FIG. 4A shows a longitudinal aberration curve of the optical imaging lens assembly according to embodiment 2 to represent deviation of a convergence focal point after light with different wavelengths passes through the lens assembly. FIG. 4B shows an astigmatism curve of the optical imaging lens assembly according to embodiment 2 to represent a tangential image surface curvature and a sagittal image surface curvature. FIG. 4C shows a distortion curve of the optical imaging lens assembly according to embodiment 2 to represent distortion values corresponding to different image heights. FIG. 4D shows a lateral color curve of the optical imaging lens assembly according to embodiment 2 to represent deviation of different image heights on the imaging surface after the light passes through the lens assembly. According to FIGS. 4A to 4D, it can be seen that the optical imaging lens assembly provided in embodiment 2 may achieve high imaging quality.

Embodiment 3

Figure 5:
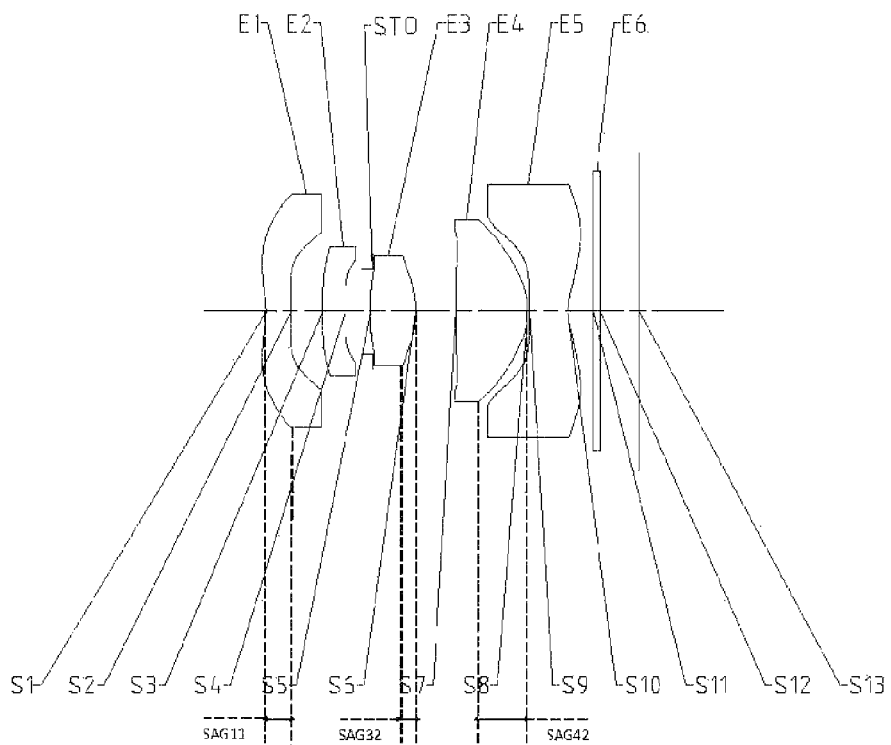
FIG. 5 shows a structure diagram of an optical imaging lens assembly according to embodiment 3 of the disclosure.

An optical imaging lens assembly according to embodiment 3 of the disclosure is described below with reference to FIGS. 5 to 6D. FIG. 5 is a structure diagram of an optical imaging lens assembly according to embodiment 3 of the disclosure.

As shown in FIG. 5, the optical imaging lens assembly sequentially includes, from an object side to an image side, a first lens E1, a second lens E2, a diaphragm STO, a third lens E3, a fourth lens E4, a fifth lens E5, an optical filter E6, and an imaging surface S13.

The first lens E1 has a negative refractive power, an object-side surface S1 thereof is a concave surface, while an image-side surface S2 is a convex surface. The second lens E2 has a negative refractive power, an object-side surface S3 thereof is a concave surface, while an image-side surface S4 is a convex surface. The third lens E3 has a positive refractive power, an object-side surface S5 thereof is a convex surface, while an image-side surface S6 is a convex surface. The fourth lens E4 has a positive refractive power, an object-side surface S7 thereof is a concave surface, while an image-side surface S8 is a convex surface. The fifth lens E5 has a negative refractive power, an object-side surface S9 thereof is a convex surface, while an image-side surface S10 is a concave surface. The optical filter E6 has an object-side surface S11 and an image-side surface S12. Light from an object sequentially penetrates through each of the surfaces S1 to S12 and is finally imaged on the imaging surface S13.

In the example, a total effective focal length f of the optical imaging lens assembly is 2.05 mm. TTL is a total length of the optical imaging lens assembly, and TTL is 5.80 mm. ImgH is a half of a diagonal length of an effective pixel region on the imaging surface S13 of the optical imaging lens assembly, and ImgH is 2.45 mm. Semi-FOV is a half of a maximum field of view of the optical imaging lens assembly, and Semi-FOV is 56.1°. Fno is an F-number of the optical imaging lens assembly, and Fno is 2.15. SAG11 is a distance from an intersection point of the object-side surface of the first lens and the optical axis to an effective radius vertex of the object-side surface of the first lens on the optical axis, and SAG11 is 0.36 mm. SAG32 is a distance from an intersection point of the image-side surface of the third lens and the optical axis to an effective radius vertex of the image-side surface of the third lens on the optical axis, and SAG32 is −0.20 mm. SAG42 is a distance from an intersection point of the image-side surface of the fourth lens and the optical axis to an effective radius vertex of the image-side surface of the fourth lens on the optical axis, and SAG42 is −0.75 mm.

Table 5 shows a basic parameter table of the optical imaging lens assembly of embodiment 3, and units of the curvature radius, the thickness/distance and the focal length are all millimeter (mm). Table 6 shows high-order coefficients that can be used for each aspheric mirror surface in embodiment 3. A surface type of each aspheric surface may be defined by the formula (1) given in embodiment 1.

imaging lens assembly provided in embodiment 3 may achieve high imaging quality.

Embodiment 4

Figure 7:
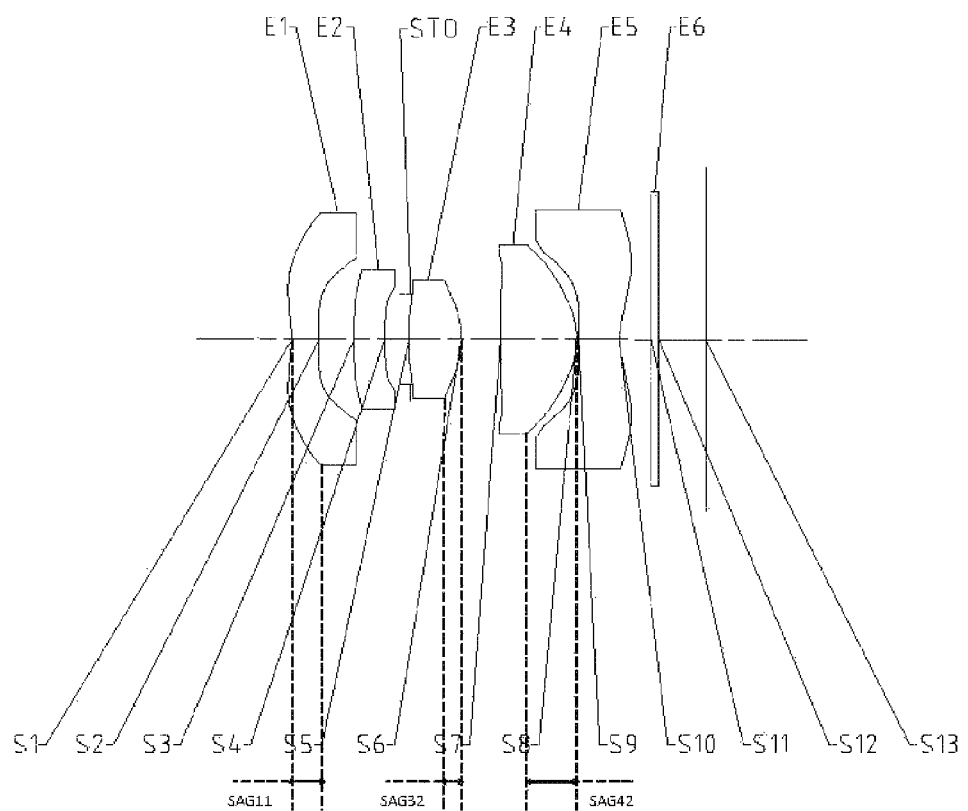
FIG. 7 shows a structure diagram of an optical imaging lens assembly according to embodiment 4 of the disclosure.

An optical imaging lens assembly according to embodiment 4 of the disclosure is described below with reference to FIGS. 7 to 8D. FIG. 7 is a structure diagram of an optical imaging lens assembly according to embodiment 4 of the disclosure.

As shown in FIG. 7, the optical imaging lens assembly sequentially includes, from an object side to an image side, a first lens E1, a second lens E2, a diaphragm STO, a third lens E3, a fourth lens E4, a fifth lens E5, an optical filter E6, and an imaging surface S13.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −1.6712 | 0.3866 | 1.54 | 55.8 | −8.07 | −0.2251 |
| S2 | Aspheric | −2.9413 | 0.4888 | | | | −90.0000 |
| S3 | Aspheric | −15.2641 | 0.3530 | 1.67 | 20.4 | −25.68 | −44.7906 |
| S4 | Aspheric | −141.3187 | 0.4206 | | | | 90.0000 |
| STO | Spherical | Infinite | −0.0272 | | | | |
| S5 | Aspheric | 9.8699 | 0.7000 | 1.55 | 56.1 | 2.55 | 58.1101 |
| S6 | Aspheric | −1.5806 | 0.6238 | | | | −10.0950 |
| S7 | Aspheric | −50.0000 | 1.1200 | 1.55 | 56.1 | 2.12 | 3.5193 |
| S8 | Aspheric | −1.1409 | 0.0250 | | | | −1.0508 |
| S9 | Aspheric | 5.4595 | 0.5968 | 1.67 | 20.4 | −1.94 | 5.8291 |
| S10 | Aspheric | 1.0006 | 0.3939 | | | | −1.2492 |
| S11 | Spherical | Infinite | 0.1100 | 1.52 | 64.2 | | |
| S12 | Spherical | Infinite | 0.6087 | | | | |
| S13 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 1.8874E+00 | −1.8358E−01 | 7.4735E−02 | −7.0254E−03 | 9.7974E−03 | −1.4512E−03 | 9.1920E−04 | −1.1323E−04 | 2.0419E−04 |
| S2 | 5.6971E−01 | −2.4512E−02 | −1.3442E−02 | −3.4247E−03 | 6.5247E−04 | 1.6602E−03 | 2.8458E−05 | −8.5878E−05 | −1.7070E−04 |
| S3 | 1.7107E−01 | −1.7947E−02 | −4.9291E−03 | −1.4005E−03 | 3.8892E−04 | 7.0658E−05 | 4.3184E−05 | −2.2225E−05 | −7.1615E−06 |
| S4 | 1.2926E−01 | 5.3407E−03 | −2.8441E−04 | −4.8981E−04 | −1.4555E−05 | −6.5262E−06 | 1.9943E−05 | −1.7038E−06 | 0.0000E+00 |
| S5 | 2.1160E−02 | 6.9126E−04 | 5.3399E−05 | 8.4702E−06 | −1.7188E−06 | 1.3181E−06 | 0.0000E+00 | 0.0000E+00 | 0.0000E+00 |
| S6 | −6.0849E−02 | 1.0883E−02 | 5.3949E−04 | 5.7989E−04 | 6.7186E−05 | 2.0960E−05 | 7.7842E−06 | −2.8129E−06 | 5.5437E−06 |
| S7 | 5.1580E−02 | −3.6068E−02 | −4.3864E−03 | −1.0998E−03 | 8.0405E−04 | 4.7552E−04 | 2.9807E−04 | 8.1632E−05 | 1.8206E−05 |
| S8 | 1.0199E−01 | −3.4128E−02 | −9.1213E−03 | 8.5692E−03 | 1.9810E−03 | 3.0906E−03 | 1.0141E−04 | 3.7155E−04 | −1.7774E−04 |
| S9 | −1.0147E+00 | 1.4435E−01 | 6.3038E−03 | 1.4966E−02 | −4.1569E−03 | −3.9132E−06 | −1.0440E−03 | 3.9239E−05 | −9.8815E−05 |
| S10 | −1.8299E+00 | 3.6780E−01 | −9.7681E−02 | 4.2725E−02 | −1.4869E−02 | 5.7347E−03 | −2.7823E−03 | 9.3875E−04 | −5.3070E−04 |

Figure 6A:
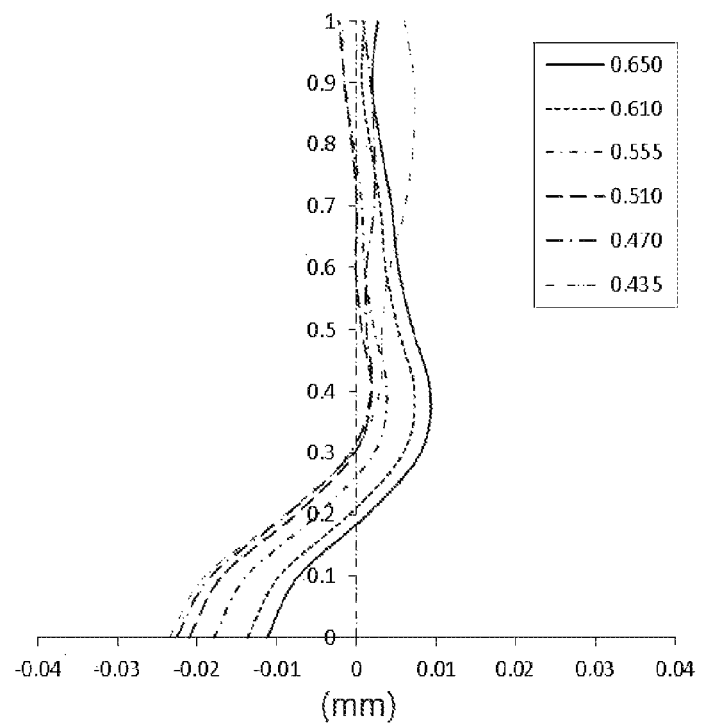
FIGS. 6A to 6D show a longitudinal aberration curve, an astigmatism curve, a distortion curve, and a lateral color curve of an optical imaging lens assembly according to embodiment 3 respectively.
Figure 6B:
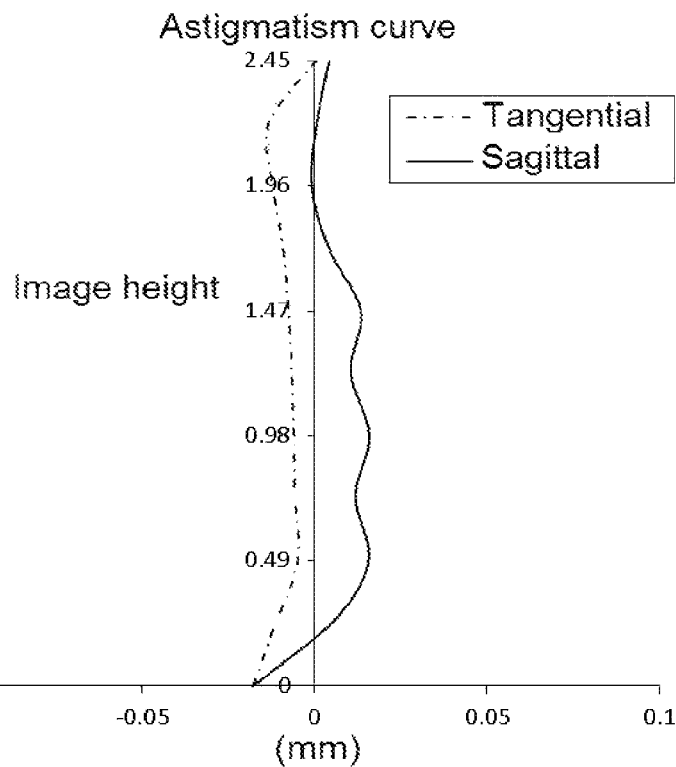
Figure 6C:
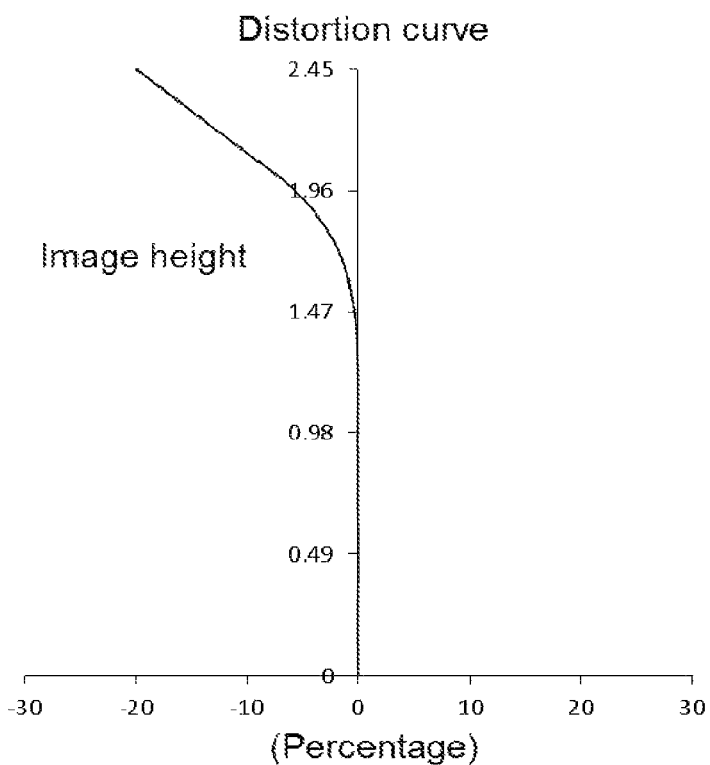
Figure 6D:
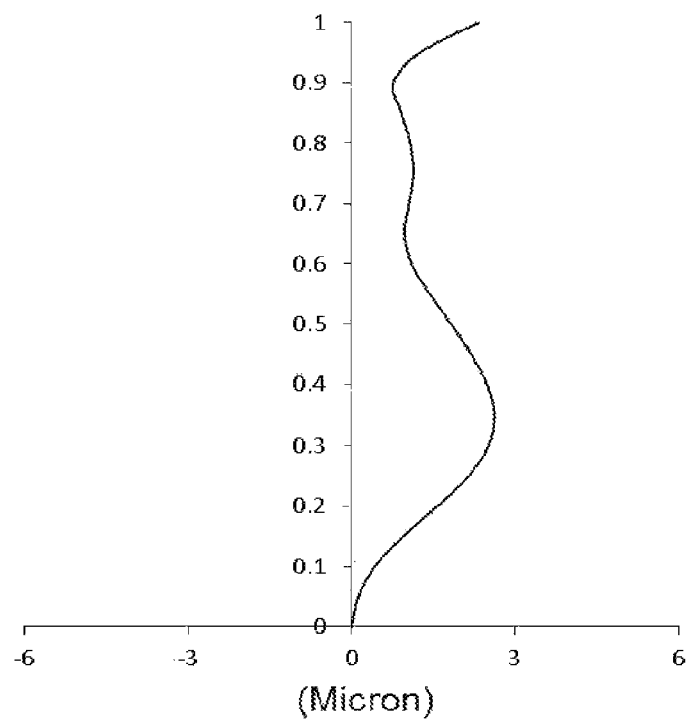

FIG. 6A shows a longitudinal aberration curve of the optical imaging lens assembly according to embodiment 3 to represent deviation of a convergence focal point after light with different wavelengths passes through the lens assembly. FIG. 6B shows an astigmatism curve of the optical imaging lens assembly according to embodiment 3 to represent a tangential image surface curvature and a sagittal image surface curvature. FIG. 6C shows a distortion curve of the optical imaging lens assembly according to embodiment 3 to represent distortion values corresponding to different image heights. FIG. 6D shows a lateral color curve of the optical imaging lens assembly according to embodiment 3 to represent deviation of different image heights on the imaging surface after the light passes through the lens assembly. According to FIGS. 6A to 6D, it can be seen that the optical The first lens E1 has a negative refractive power, an object-side surface S1 thereof is a concave surface, while an image-side surface S2 is a convex surface. The second lens E2 has a negative refractive power, an object-side surface S3 thereof is a concave surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a concave surface, while an image-side surface S8 is a convex surface. The fifth lens E5 has a negative refractive power, an object-side surface S9 thereof is a convex surface, while an image-side surface S10 is a concave surface. The optical filter E6 has an object-side surface S11 and an image-side surface S12. Light from an object sequentially penetrates through each of the surfaces S1 to S12 and is finally imaged on the imaging surface S13.

In the example, a total effective focal length f of the optical imaging lens assembly is 1.93 mm. TTL is a total length of the optical imaging lens assembly, and TTL is 5.94 mm. ImgH is a half of a diagonal length of an effective pixel region on the imaging surface S13 of the optical imaging lens assembly, and ImgH is 2.45 mm. Semi-FOV is a half of a maximum field of view of the optical imaging lens assembly, and Semi-FOV is 58.4°. Fno is an F-number of the optical imaging lens assembly, and Fno is 2.18. SAG11 is a distance from an intersection point of the object-side surface of the first lens and the optical axis to an effective radius vertex of the object-side surface of the first lens on the optical axis, and SAG11 is 0.38 mm. SAG32 is a distance from an intersection point of the image-side surface of the third lens and the optical axis to an effective radius vertex of the image-side surface of the third lens on the optical axis, and SAG32 is −0.23 mm. SAG42 is a distance from an intersection point of the image-side surface of the fourth lens and the optical axis to an effective radius vertex of the image-side surface of the fourth lens on the optical axis, and SAG42 is −0.71 mm.

Table 7 shows a basic parameter table of the optical imaging lens assembly of embodiment 4, and units of the curvature radius, the thickness/distance and the focal length are all millimeter (mm). Table 8 shows high-order coefficients that can be used for each aspheric mirror surface in embodiment 4. A surface type of each aspheric surface may be defined by the formula (1) given in embodiment 1.

Figure 8C:
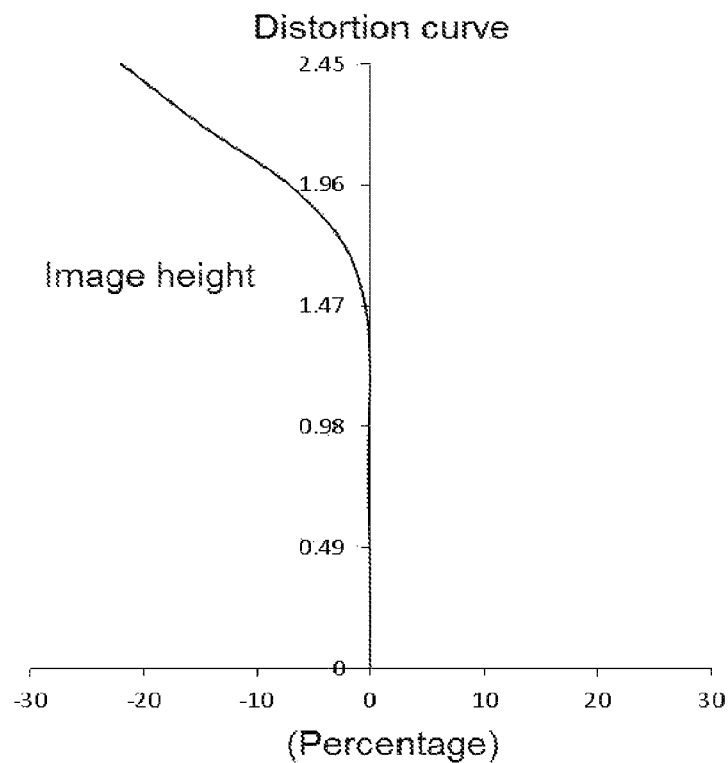
Figure 8D:
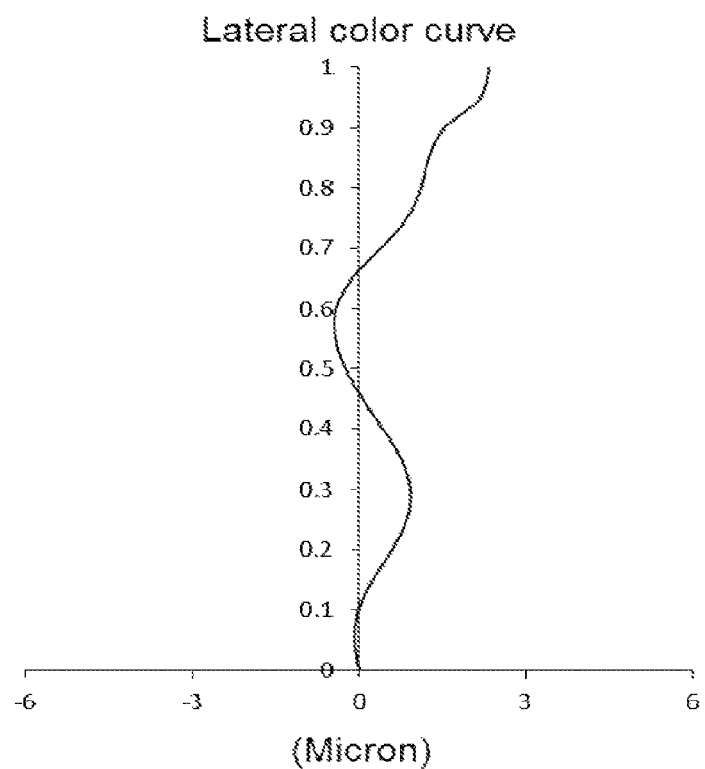

FIG. 8A shows a longitudinal aberration curve of the optical imaging lens assembly according to embodiment 4 to represent deviation of a convergence focal point after light with different wavelengths passes through the lens assembly. FIG. 8B shows an astigmatism curve of the optical imaging lens assembly according to embodiment 4 to represent a tangential image surface curvature and a sagittal image surface curvature. FIG. 8C shows a distortion curve of the optical imaging lens assembly according to embodiment 4 to represent distortion values corresponding to different image heights. FIG. 8D shows a lateral color curve of the optical imaging lens assembly according to embodiment 4 to represent deviation of different image heights on the imaging surface after the light passes through the lens assembly. According to FIGS. 8A to 8D, it can be seen that the optical imaging lens assembly provided in embodiment 4 may achieve high imaging quality.

Embodiment 5

Figure 9:
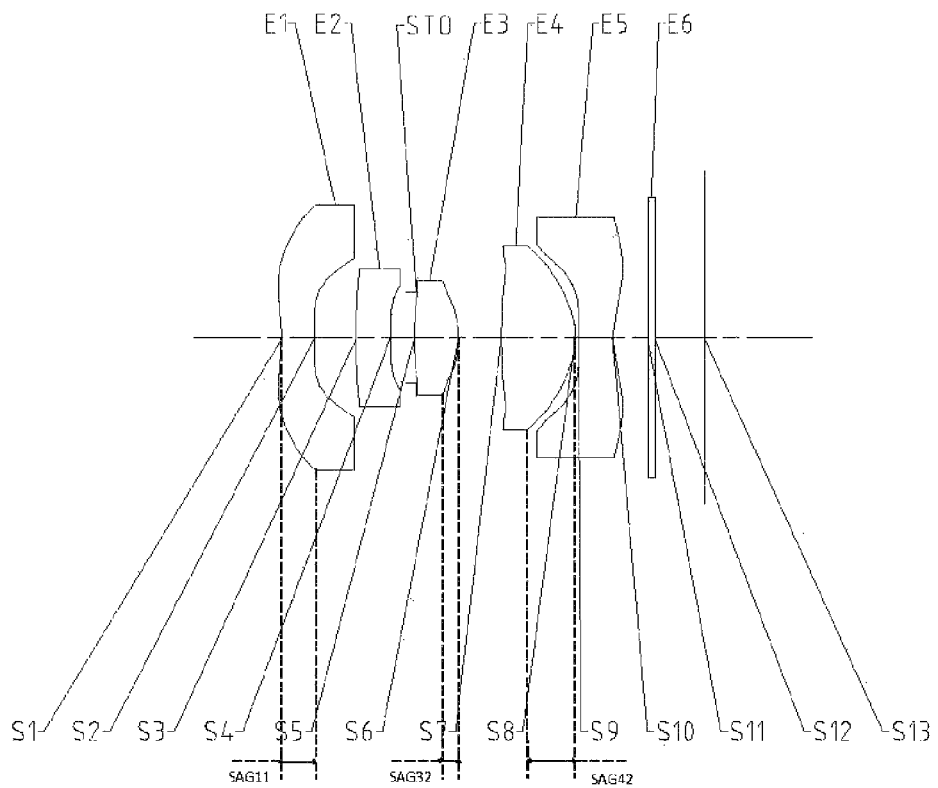
FIG. 9 shows a structure diagram of an optical imaging lens assembly according to embodiment 5 of the disclosure.

An optical imaging lens assembly according to embodiment 5 of the disclosure is described below with reference to FIGS. 9 to 10D. FIG. 9 is a structure diagram of an optical imaging lens assembly according to embodiment 5 of the disclosure.

As shown in FIG. 9, the optical imaging lens assembly sequentially includes, from an object side to an image side, a first lens E1, a second lens E2, a diaphragm STO, a third lens E3, a fourth lens E4, a fifth lens E5, an optical filter E6, and an imaging surface S13.

TABLE 7

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Aspheric | −1.6633 | 0.3903 | 1.54 | 55.8 | −5.53 | −0.2269 |
| S2 | Aspheric | −4.0975 | 0.4970 | | | | −90.0000 |
| S3 | Aspheric | −100.0000 | 0.4421 | 1.67 | 20.4 | −17.31 | 90.0000 |
| S4 | Aspheric | 13.0812 | 0.3800 | | | | 90.0000 |
| STO | Spherical | Infinite | −0.0270 | | | | |
| S5 | Aspheric | 9.6624 | 0.7500 | 1.55 | 56.1 | 2.30 | 66.3041 |
| S6 | Aspheric | −1.4054 | 0.5636 | | | | −7.9154 |
| S7 | Aspheric | −26.6578 | 1.1000 | 1.55 | 56.1 | 2.19 | 90.0000 |
| S8 | Aspheric | −1.1632 | 0.0250 | | | | −0.9819 |
| S9 | Aspheric | 5.7911 | 0.5849 | 1.67 | 20.4 | −2.13 | 8.6169 |
| S10 | Aspheric | 1.0964 | 0.4570 | | | | −1.1654 |
| S11 | Spherical | Infinite | 0.1100 | 1.52 | 64.2 | | |
| S12 | Spherical | Infinite | 0.6718 | | | | |
| S13 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 1.9269E+00 | −2.1096E−01 | 8.6059E−02 | −9.0229E−03 | 1.0557E−02 | −2.1653E−03 | 1.2077E−03 | −1.0864E−04 | 2.3628E−04 |
| S2 | 6.5050E−01 | −4.8525E−02 | −9.9312E−03 | −3.6368E−03 | 2.5453E−03 | 1.3208E−03 | −1.4396E−04 | −2.9624E−04 | −1.6342E−04 |
| S3 | 1.5325E−01 | −2.6821E−02 | −5.0553E−03 | −5.7623E−04 | 5.5246E−04 | −6.2475E−05 | −4.6330E−05 | −4.2210E−05 | 2.6668E−06 |
| S4 | 1.2549E−01 | 5.3012E−03 | −2.1181E−05 | −2.8405E−04 | 8.3313E−06 | −2.6434E−05 | 6.8135E−07 | −9.8735E−06 | 0.0000E+00 |
| S5 | 2.4418E−02 | 6.6434E−04 | 6.8795E−05 | 1.5814E−05 | −4.2256E−06 | 1.8000E−06 | 0.0000E+00 | 0.0000E+00 | 0.0000E+00 |
| S6 | −7.6029E−02 | 1.0596E−02 | 7.3711E−04 | 6.9115E−04 | 1.0779E−04 | 2.4887E−05 | 1.4741E−05 | 5.6899E−07 | 1.1543E−05 |
| S7 | 6.3794E−02 | −4.1360E−02 | −3.6047E−03 | −2.4206E−04 | 1.3383E−03 | 7.3984E−04 | 3.3499E−04 | 7.2797E−05 | 2.9663E−06 |
| S8 | 8.4048E−02 | −3.2444E−02 | −3.3202E−03 | 1.0773E−02 | 3.1575E−03 | 3.4482E−03 | 2.0149E−04 | 2.8118E−04 | −2.4979E−04 |
| S9 | −9.5476E−01 | 1.2924E−01 | 1.5797E−02 | 1.3036E−02 | −4.6577E−03 | −4.7518E−05 | −9.3306E−04 | 1.9749E−05 | −8.0940E−05 |
| S10 | −1.7050E+00 | 3.3260E−01 | −7.4859E−02 | 3.3534E−02 | −1.3081E−02 | 3.9220E−03 | −2.5965E−03 | 4.6737E−04 | −5.2901E−04 |

The first lens E1 has a negative refractive power, an object-side surface S1 thereof is a concave surface, while an image-side surface S2 is a convex surface. The second lens E2 has a negative refractive power, an object-side surface S3 thereof is a concave surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The optical filter E6 has an object-side surface S11 and an image-side surface S12. Light from an object sequentially penetrates through each of the surfaces S1 to S12 and is finally imaged on the imaging surface S13.

In the example, a total effective focal length f of the optical imaging lens assembly is 1.87 mm. TTL is a total length of the optical imaging lens assembly, and TTL is 6.25 mm. ImgH is a half of a diagonal length of an effective pixel region on the imaging surface S13 of the optical imaging lens assembly, and ImgH is 2.45 mm. Semi-FOV is a half of a maximum field of view of the optical imaging lens assembly, and Semi-FOV is 58.9°. Fno is an F-number of the optical imaging lens assembly, and Fno is 2.19. SAG11 is a distance from an intersection point of the object-side surface of the first lens and the optical axis to an effective radius vertex of the object-side surface of the first lens on the optical axis, and SAG11 is 0.46 mm. SAG32 is a distance from an intersection point of the image-side surface of the third lens and the optical axis to an effective radius vertex of the image-side surface of the third lens on the optical axis, and SAG32 is −0.23 mm. SAG42 is a distance from an intersection point of the image-side surface of the fourth lens and the optical axis to an effective radius vertex of the image-side surface of the fourth lens on the optical axis, and SAG42 is −0.69 mm.

Table 9 shows a basic parameter table of the optical imaging lens assembly of embodiment 5, and units of the curvature radius, the thickness/distance and the focal length are all millimeter (mm). Table 10 shows high-order coefficients that can be used for each aspheric mirror surface in embodiment 5. A surface type of each aspheric surface may be defined by the formula (1) given in embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −1.7786 | 0.4760 | 1.54 | 55.8 | −4.52 | −0.2677 |
| S2 | Aspheric | −7.3029 | 0.6193 | | | | −90.0000 |
| S3 | Aspheric | −80.0000 | 0.5046 | 1.67 | 20.4 | −17.44 | −90.0000 |
| S4 | Aspheric | 13.6529 | 0.3800 | | | | −27.7046 |
| STO | Spherical | Infinite | −0.0253 | | | | |
| S5 | Aspheric | 12.5815 | 0.6500 | 1.55 | 56.1 | 2.36 | 58.7036 |
| S6 | Aspheric | −1.4094 | 0.6362 | | | | −8.3461 |
| S7 | Aspheric | 32.2319 | 1.1000 | 1.55 | 56.1 | 2.18 | −90.0000 |
| S8 | Aspheric | −1.2183 | 0.0400 | | | | −0.9692 |
| S9 | Aspheric | 5.9420 | 0.5092 | 1.67 | 20.4 | −2.25 | 9.3257 |
| S10 | Aspheric | 1.1574 | 0.5176 | | | | −1.0655 |
| S11 | Spherical | Infinite | 0.1100 | 1.52 | 64.2 | | |
| S12 | Spherical | Infinite | 0.7324 | | | | |
| S13 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 2.0494E+00 | −2.3004E−01 | 8.7711E−02 | −1.4564E−02 | 1.0422E−02 | −2.5283E−03 | 1.1973E−03 | −2.8178E−04 | 1.8163E−04 |
| S2 | 6.9111E−01 | −3.9419E−02 | −7.1773E−03 | −5.9432E−03 | 7.8242E−04 | 9.7784E−04 | 2.3890E−04 | 1.6015E−05 | −5.7806E−05 |
| S3 | 8.8387E−02 | −3.4934E−02 | −3.3826E−03 | 4.9505E−04 | 5.7545E−04 | −1.1771E−04 | −7.5497E−05 | −4.5163E−05 | −6.4583E−06 |
| S4 | 9.5559E−02 | 1.9983E−03 | 1.0273E−04 | −4.6835E−05 | 6.1789E−05 | 3.0737E−06 | 6.6262E−06 | −6.3634E−06 | 0.0000E+00 |
| S5 | 1.6417E−02 | 1.7114E−04 | 2.2618E−05 | 9.5048E−06 | −1.9849E−06 | 6.4088E−07 | 0.0000E+00 | 0.0000E+00 | 0.0000E+00 |
| S6 | −6.8333E−02 | 7.6933E−03 | −5.2883E−05 | 3.7981E−04 | 3.0226E−05 | 1.3164E−05 | 4.4880E−06 | −5.7637E−06 | 1.7977E−06 |
| S7 | 6.0572E−02 | −3.4654E−02 | −4.7463E−03 | −1.4285E−03 | 3.5683E−04 | 3.4604E−04 | 2.1653E−04 | 6.6269E−05 | 1.4982E−05 |
| S8 | 7.9316E−02 | −3.5464E−02 | −5.8575E−03 | 5.8923E−03 | 1.5147E−03 | 2.5352E−03 | 2.2627E−04 | 2.8930E−04 | −5.4879E−05 |
| S9 | −9.3597E−01 | 1.2543E−01 | 1.2201E−02 | 9.7851E−03 | −3.8863E−03 | 8.5450E−04 | −6.7411E−04 | −1.7495E−04 | −1.0049E−04 |
| S10 | −1.6780E+00 | 3.3132E−01 | −6.8416E−02 | 2.4903E−02 | −1.4516E−02 | 2.1303E−03 | −3.2640E−03 | −1.0746E−05 | −7.0026E−04 |

Figure 10A:
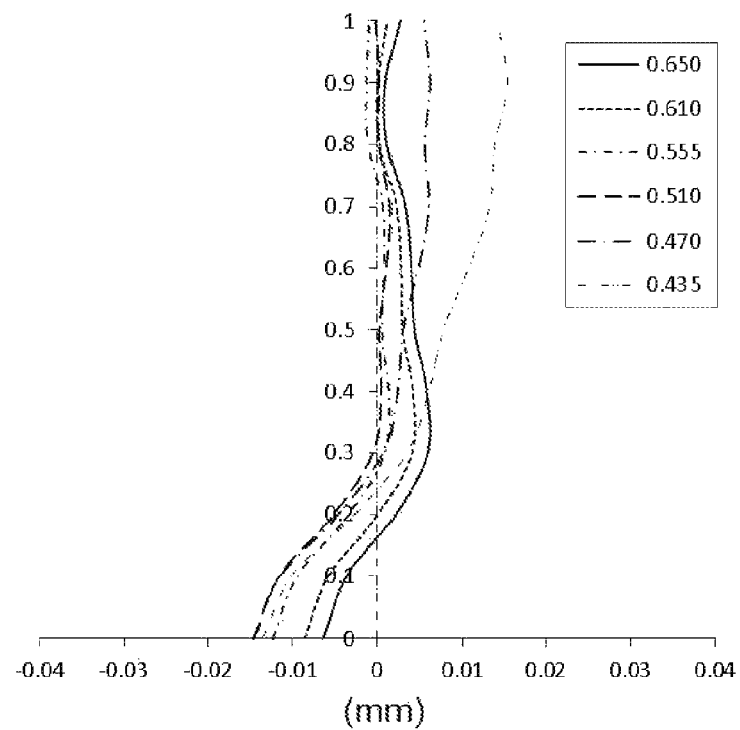
Figure 10D:
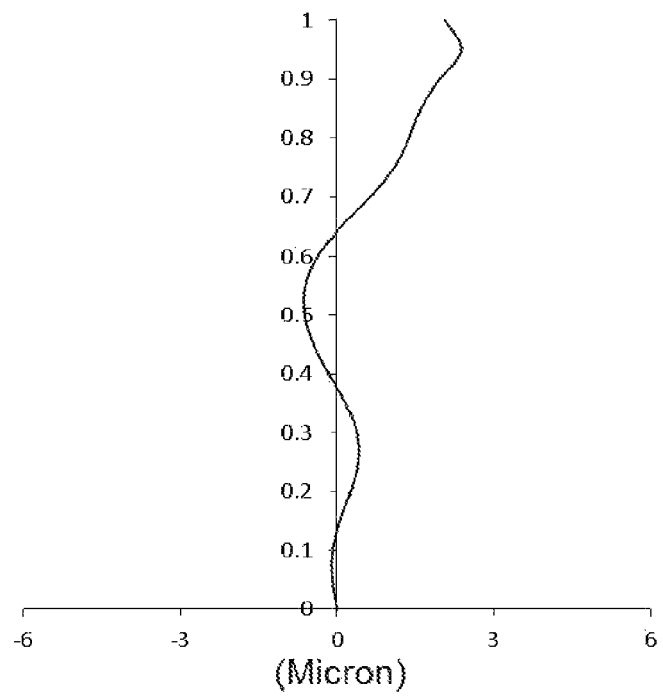

FIG. 10A shows a longitudinal aberration curve of the optical imaging lens assembly according to embodiment 5 to represent deviation of a convergence focal point after light with different wavelengths passes through the lens assembly. FIG. 10B shows an astigmatism curve of the optical imaging lens assembly according to embodiment 5 to represent a tangential image surface curvature and a sagittal image surface curvature. FIG. 10O shows a distortion curve of the optical imaging lens assembly according to embodiment 5 to represent distortion values corresponding to different image heights. FIG. 10D shows a lateral color curve of the optical imaging lens assembly according to embodiment 5 to represent deviation of different image heights on the imaging surface after the light passes through the lens assembly. According to FIGS. 10A to 10D, it can be seen that the optical imaging lens assembly provided in embodiment 5 may achieve high imaging quality.

Embodiment 6

Figure 11:
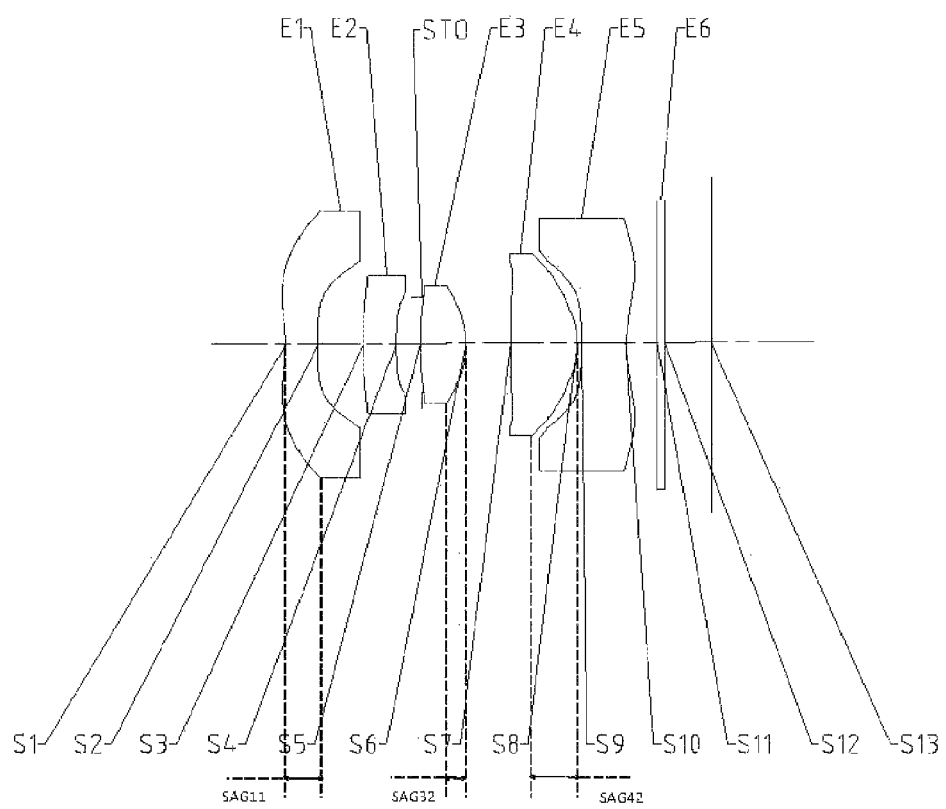
FIG. 11 shows a structure diagram of an optical imaging lens assembly according to embodiment 6 of the disclosure.

An optical imaging lens assembly according to embodiment 6 of the disclosure is described below with reference to FIGS. 11 to 12D. FIG. 11 is a structure diagram of an optical imaging lens assembly according to embodiment 6 of the disclosure.

As shown in FIG. 11, the optical imaging lens assembly sequentially includes, from an object side to an image side, a first lens E1, a second lens E2, a diaphragm STO, a third lens E3, a fourth lens E4, a fifth lens E5, an optical filter E6, and an imaging surface S13.

The first lens E1 has a negative refractive power, an object-side surface S1 thereof is a concave surface, while an image-side surface S2 is a convex surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a concave surface, while an image-side surface S8 is a convex surface. The fifth lens E5 has a negative refractive power, an object-side surface S9 thereof is a concave surface, while an image-side surface S10 is a concave surface. The optical filter E6 has an object-side surface S11 and an image-side surface S12. Light from an object sequentially penetrates through each of the surfaces S1 to S12 and is finally imaged on the imaging surface S13.

In the example, a total effective focal length f of the optical imaging lens assembly is 1.95 mm. TTL is a total length of the optical imaging lens assembly, and TTL is 6.25 mm. ImgH is a half of a diagonal length of an effective pixel region on the imaging surface S13 of the optical imaging lens assembly, and ImgH is 2.45 mm. Semi-FOV is a half of a maximum field of view of the optical imaging lens assembly, and Semi-FOV is 56.9°. Fno is an F-number of the optical imaging lens assembly, and Fno is 2.14. SAG11 is a distance from an intersection point of the object-side surface of the first lens and the optical axis to an effective radius vertex of the object-side surface of the first lens on the optical axis, and SAG11 is 0.49 mm. SAG32 is a distance from an intersection point of the image-side surface of the third lens and the optical axis to an effective radius vertex of the image-side surface of the third lens on the optical axis, and SAG32 is −0.27 mm. SAG42 is a distance from an intersection point of the image-side surface of the fourth lens and the optical axis to an effective radius vertex of the image-side surface of the fourth lens on the optical axis, and SAG42 is −0.66 mm.

Table 11 shows a basic parameter table of the optical imaging lens assembly of embodiment 6, and units of the curvature radius, the thickness/distance and the focal length are all millimeter (mm). Table 12 shows high-order coefficients that can be used for each aspheric mirror surface in embodiment 6. A surface type of each aspheric surface may be defined by the formula (1) given in embodiment 1.

TABLE 11

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Aspheric | −1.9237 | 0.4762 | 1.54 | 55.8 | −4.89 | −0.1416 |
| S2 | Aspheric | −7.8086 | 0.6639 | | | | −90.0000 |
| S3 | Aspheric | 28.6585 | 0.4789 | 1.67 | 20.4 | −21.18 | −32.0458 |
| S4 | Aspheric | 9.4019 | 0.3800 | | | | −49.1697 |
| STO | Spherical | Infinite | −0.0235 | | | | |
| S5 | Aspheric | 11.8782 | 0.6667 | 1.55 | 56.1 | 2.29 | −64.6835 |
| S6 | Aspheric | −1.3720 | 0.6596 | | | | −7.6106 |
| S7 | Aspheric | −31.8393 | 0.9800 | 1.55 | 56.1 | 2.18 | −90.0000 |
| S8 | Aspheric | −1.1578 | 0.0600 | | | | −1.1031 |
| S9 | Aspheric | −68.0000 | 0.6453 | 1.67 | 20.4 | −2.04 | −90.0000 |
| S10 | Aspheric | 1.3972 | 0.4690 | | | | −1.0544 |
| S11 | Spherical | Infinite | 0.1100 | 1.52 | 64.2 | | |
| S12 | Spherical | Infinite | 0.6838 | | | | |
| S13 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 2.0804E+00 | −2.1649E−01 | 8.8281E−02 | −1.0610E−02 | 1.1409E−02 | −1.8195E−03 | 1.2783E−03 | −1.7216E−04 | 2.2809E−04 |
| S2 | 6.9453E−01 | −4.6153E−02 | −7.4342E−03 | −4.5968E−03 | 1.7810E−03 | 1.2419E−03 | 2.5881E−04 | −4.3997E−05 | −6.8544E−05 |
| S3 | 7.4873E−02 | −2.0835E−02 | −1.9986E−03 | 1.2834E−05 | 2.8981E−04 | −3.5265E−05 | −1.8285E−05 | −1.3947E−05 | −4.5740E−06 |
| S4 | 9.9673E−02 | 3.0426E−03 | 5.5936E−04 | 6.8971E−05 | 8.7367E−05 | −8.5102E−06 | −6.2064E−07 | −1.2611E−05 | 0.0000E+00 |
| S5 | 2.2984E−02 | 2.1437E−04 | 1.0044E−04 | 3.2876E−05 | 8.3344E−07 | 7.4552E−07 | 0.0000E+00 | 0.0000E+00 | 0.0000E+00 |
| S6 | −9.7159E−02 | 8.2709E−03 | −1.3770E−04 | 5.7397E−04 | 7.1429E−05 | 3.2774E−05 | 9.3871E−06 | −4.2915E−06 | 3.1104E−06 |
| S7 | 6.4204E−02 | −3.8156E−02 | −5.5604E−03 | −1.6489E−03 | 4.5194E−04 | 4.8389E−04 | 3.0547E−04 | 1.0389E−04 | 2.4821E−05 |
| S8 | 1.1154E−01 | −5.3605E−02 | 2.3891E−03 | 1.8260E−03 | 3.9252E−03 | 1.7836E−03 | 1.0285E−03 | 6.4070E−05 | 6.2771E−05 |
| S9 | −6.7752E−01 | 6.5950E−02 | 2.2707E−02 | 6.3669E−03 | −2.2591E−04 | −3.1660E−04 | −1.7803E−04 | −4.7775E−04 | −4.7393E−05 |
| S10 | −1.4102E+00 | 2.3925E−01 | −4.9611E−02 | 2.0826E−02 | −7.6513E−03 | 2.3636E−03 | −1.2596E−03 | 2.3108E−04 | −2.0639E−04 |

Figure 12A:
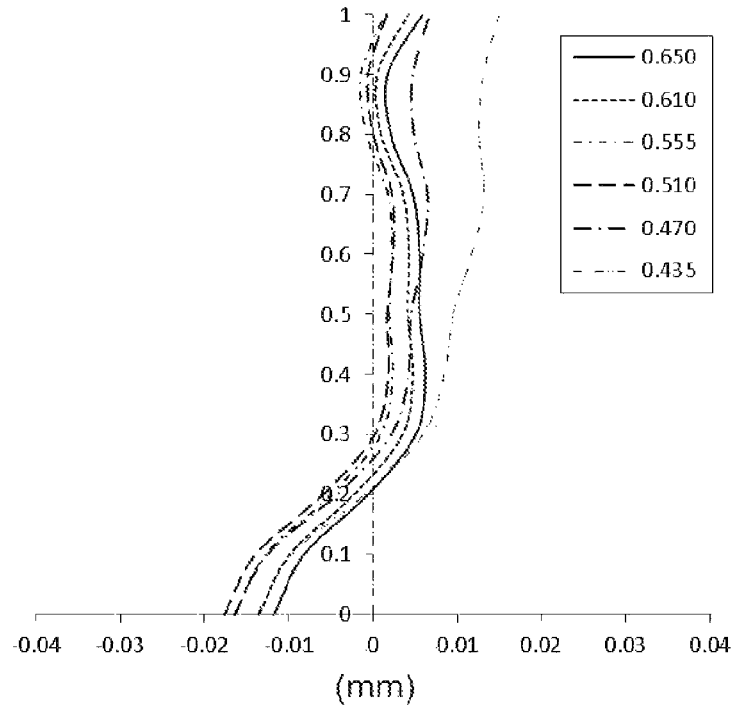
FIGS. 12A to 12D show a longitudinal aberration curve, an astigmatism curve, a distortion curve and a lateral color curve of an optical imaging lens assembly according to embodiment 6 respectively.
Figure 12B:
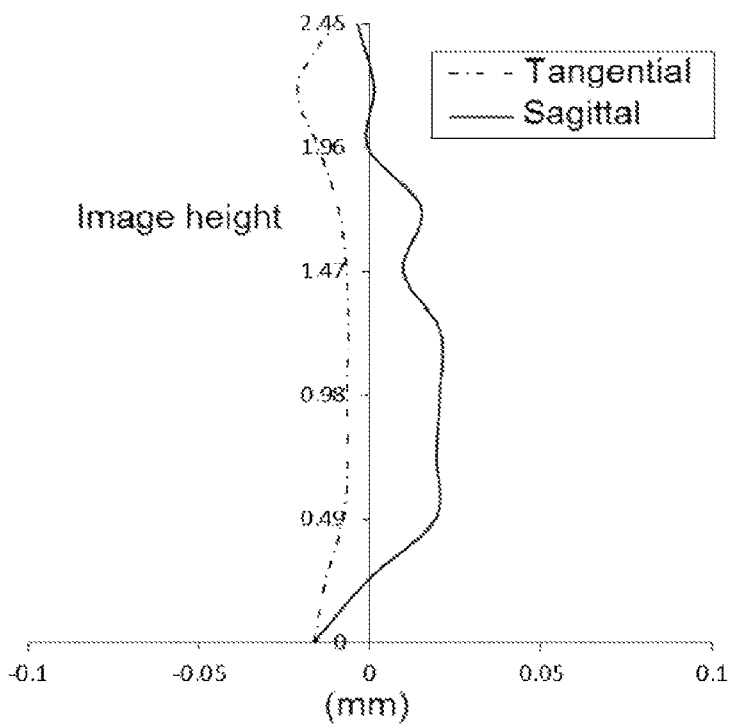
Figure 12C:
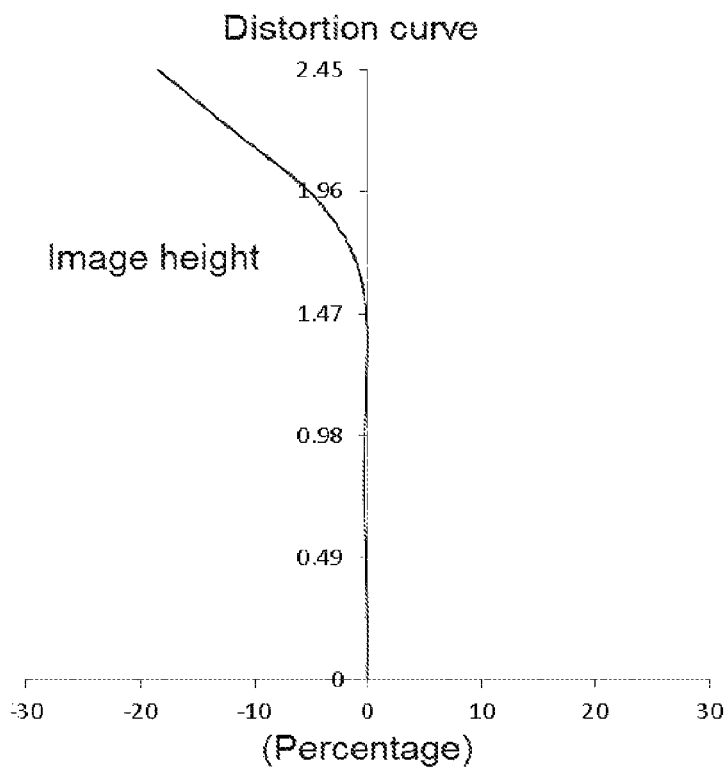
Figure 12D:
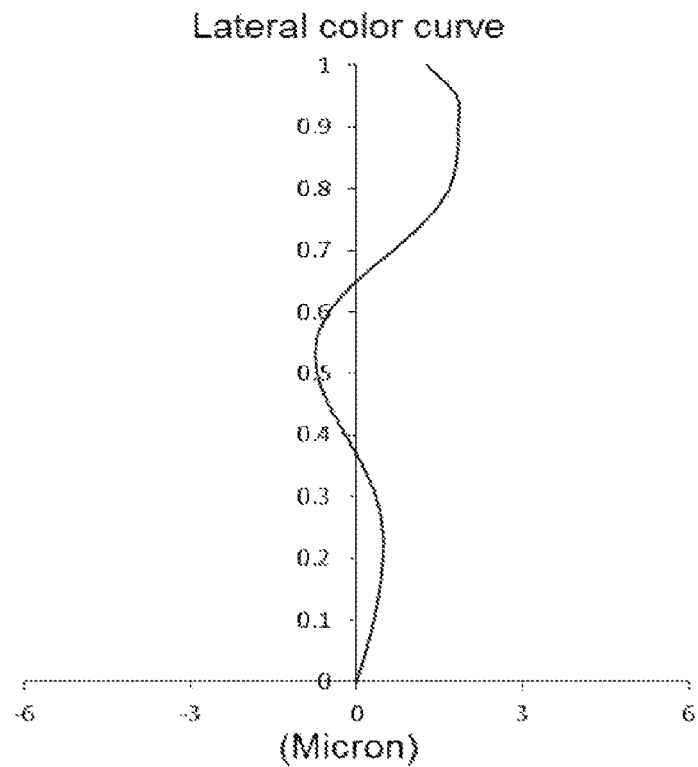

FIG. 12A shows a longitudinal aberration curve of the optical imaging lens assembly according to embodiment 6 to represent deviation of a convergence focal point after light with different wavelengths passes through the lens assembly. FIG. 12B shows an astigmatism curve of the optical imaging lens assembly according to embodiment 6 to represent a tangential image surface curvature and a sagittal image surface curvature. FIG. 12C shows a distortion curve of the optical imaging lens assembly according to embodiment 6 to represent distortion values corresponding to different image heights. FIG. 12D shows a lateral color curve of the optical imaging lens assembly according to embodiment 6 to represent deviation of different image heights on the imaging surface after the light passes through the lens assembly. According to FIGS. 12A to 12D, it can be seen that the optical imaging lens assembly provided in embodiment 6 may achieve high imaging quality.

From the above, embodiment 1 to embodiment 6 meet a relationship shown in Table 13 respectively.

TABLE 13

| Conditional expression/ embodiment | 1 | 2 | 3 | 4 | 5 | 6 |
|---|---|---|---|---|---|---|
| f1/f | −3.58 | −2.80 | −3.93 | −2.87 | −2.41 | −2.51 |
| (f3 + f4)/f5 | −2.36 | −2.36 | −2.41 | −2.11 | −2.02 | −2.19 |
| ET1/CT1 | 1.06 | 1.42 | 1.21 | 1.26 | 1.17 | 1.15 |
| CT4/ET4 | 2.99 | 3.02 | 3.02 | 2.84 | 3.02 | 3.05 |
| DT31/SAG32 | −2.92 | −3.16 | −3.28 | −2.72 | −2.91 | −2.58 |
| SAG42/SAG11 | −1.93 | −2.17 | −2.09 | −1.85 | −1.49 | −1.34 |
| ImgH/f | 1.19 | 1.29 | 1.19 | 1.27 | 1.31 | 1.26 |
| TTL/SL | 1.37 | 1.38 | 1.40 | 1.40 | 1.46 | 1.47 |
| R8/R10 | −1.58 | −1.11 | −1.14 | −1.06 | −1.05 | −0.83 |
| R5/R6 | −4.91 | −19.44 | −6.24 | −6.88 | −8.93 | −8.66 |
| CT3/CT2 | 2.09 | 2.01 | 1.98 | 1.70 | 1.29 | 1.39 |
| R2/R1 | 2.02 | 2.39 | 1.76 | 2.46 | 4.11 | 4.06 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned optical imaging lens assembly.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis:
    a first lens with a negative refractive power, an object-side surface thereof is a concave surface, an image-side surface thereof is a convex surface;
    a second lens with a refractive power;
    a diaphragm;
    a third lens with a refractive power, an object-side surface thereof is a convex surface, an image-side surface thereof is a convex surface;
    a fourth lens with a refractive power; and
    a fifth lens with a refractive power,
    wherein Semi-FOV is a half of a maximum field of view of the optical imaging lens assembly, and Semi-FOV meets Semi-FOV≥55°; and
    SAG11 is a distance from an intersection point of the object-side surface of the first lens and the optical axis to an effective radius vertex of the object-side surface of the first lens on the optical axis, SAG42 is a distance from an intersection point of an image-side surface of the fourth lens and the optical axis to an effective radius vertex of the image-side surface of the fourth lens on the optical axis, and SAG11 and SAG42 meet −2.5<SAG42/SAG11<−1.0.

2. The optical imaging lens assembly according to claim 1, wherein a total effective focal length f of the optical imaging lens assembly and an effective focal length f1 of the first lens meet −4.0<f1/f<−2.0.

3. The optical imaging lens assembly according to claim 1, wherein an effective focal length f3 of the third lens, an effective focal length f4 of the fourth lens and an effective focal length f5 of the fifth lens meet −2.5<(f3+f4)/f5<−2.0.

4. The optical imaging lens assembly according to claim 1, wherein an edge thickness ET1 of the first lens and a center thickness CT1 of the first lens on the optical axis meet 1.0<ET1/CT1<1.5.

5. The optical imaging lens assembly according to claim 1, wherein an edge thickness ET4 of the fourth lens and a center thickness CT4 of the fourth lens on the optical axis meet 2.5<CT4/ET4<3.5.

6. The optical imaging lens assembly according to claim 1, wherein SAG32 is a distance from an intersection point of the image-side surface of the third lens and the optical axis to an effective radius vertex of the image-side surface of the third lens on the optical axis, and DT31 is a maximum effective radius of the object-side surface of the third lens, DT31 and SAG32 meet −3.5<DT31/SAG32<−2.5.

7. The optical imaging lens assembly according to claim 1, wherein a curvature radius R8 of the image-side surface of the fourth lens and a curvature radius R10 of an image-side surface of the fifth lens meet −2.0<R8/R10<−0.8.

8. The optical imaging lens assembly according to claim 1, wherein a curvature radius R5 of the object-side surface of the third lens and a curvature radius R6 of the image-side surface of the third lens meet −19.5<R5/R6<−4.5.

9. The optical imaging lens assembly according to claim 1, wherein a center thickness CT2 of the second lens on the optical axis and a center thickness CT3 of the third lens on the optical axis meet 1.0<CT3/CT2<2.5.

10. The optical imaging lens assembly according to claim 1, wherein a curvature radius R1 of the object-side surface of the first lens and a curvature radius R2 of the image-side surface of the first lens meet 1.5<R2/R1<4.5.

11. The optical imaging lens assembly according to claim 1, wherein a spacing distance of the third lens and the fourth lens on the optical axis is longer than that of any two adjacent lenses in the first lens to the fifth lens on the optical axis.

12. The optical imaging lens assembly according to claim 1, wherein a spacing distance of the fourth lens and the fifth lens on the optical axis is shorter than that of any two adjacent lenses in the first lens to the fifth lens on the optical axis.

13. The optical imaging lens assembly according to claim 1, wherein ImgH is a half of a diagonal length of an effective pixel region on an imaging surface of the optical imaging lens assembly, and ImgH and a total effective focal length f of the optical imaging lens assembly meet 1.0<ImgH/f<1.5.

14. The optical imaging lens assembly according to claim 1, wherein SL is a distance from the diaphragm to an imaging surface of the optical imaging lens assembly on the optical axis, TTL is a distance from the object-side surface of the first lens to the imaging surface of the optical imaging lens assembly on the optical axis, and SL and TTL meet 1.0<TTL/SL<1.5.

15. An optical imaging lens assembly, sequentially comprising, from an object side to an image side along an optical axis:
   a first lens with a negative refractive power, an object-side surface thereof is a concave surface, an image-side surface thereof is a convex surface;
   a second lens with a refractive power;
   a diaphragm;
   a third lens with a refractive power, an object-side surface thereof is a convex surface, an image-side surface thereof is a convex surface;
   a fourth lens with a refractive power; and
   a fifth lens with a refractive power,
   wherein Semi-FOV is a half of a maximum field of view of the optical imaging lens assembly, and Semi-FOV meets Semi-FOV≥55°; and
   an effective focal length f3 of the third lens, an effective focal length f4 of the fourth lens and an effective focal length f5 of the fifth lens meet −2.5<(f3+f4)/f5<−2.0.

16. The optical imaging lens assembly according to claim 15, wherein a total effective focal length f of the optical imaging lens assembly and an effective focal length f1 of the first lens meet −4.0<f1/f<−2.0.

17. The optical imaging lens assembly according to claim 15, wherein an edge thickness ET1 of the first lens and a center thickness CT1 of the first lens on the optical axis meet 1.0<ET1/CT1<1.5.

18. The optical imaging lens assembly according to claim 15, wherein an edge thickness ET4 of the fourth lens and a center thickness CT4 of the fourth lens on the optical axis meet 2.5<CT4/ET4<3.5.

19. The optical imaging lens assembly according to claim 15, wherein SAG32 is a distance from an intersection point of the image-side surface of the third lens and the optical axis to an effective radius vertex of the image-side surface of the third lens on the optical axis, and DT31 is a maximum effective radius of an object-side surface of the third lens, DT31 and SAG32 meet −3.5<DT31/SAG32<−2.5.

20. The optical imaging lens assembly according to claim 15, wherein a curvature radius R8 of an image-side surface of the fourth lens and a curvature radius R10 of an image-side surface of the fifth lens meet −2.0<R8/R10<−0.8.

* * * * *